US008358085B2

(12) United States Patent
Catalano et al.

(10) Patent No.: US 8,358,085 B2
(45) Date of Patent: Jan. 22, 2013

(54) METHOD AND DEVICE FOR REMOTE SENSING AND CONTROL OF LED LIGHTS

(75) Inventors: Anthony Catalano, Boulder, CO (US); Daniel Harrison, Nederland, CO (US)

(73) Assignee: Terralux, Inc., Longmont, CO (US)

( * ) Notice: Subject to any disclaimer, the term of this patent is extended or adjusted under 35 U.S.C. 154(b) by 396 days.

(21) Appl. No.: 12/683,393

(22) Filed: Jan. 6, 2010

(65) Prior Publication Data

US 2010/0176746 A1     Jul. 15, 2010

Related U.S. Application Data

(60) Provisional application No. 61/144,408, filed on Jan. 13, 2009.

(51) Int. Cl.
H05B 37/02 (2006.01)
G01K 7/00 (2006.01)
G01K 7/22 (2006.01)
G01K 15/00 (2006.01)

(52) U.S. Cl. ............ 315/297; 315/185 R; 315/224; 315/291; 315/307; 315/308; 374/163; 374/185; 374/E7.001; 374/E7.028; 374/E15.001

(58) Field of Classification Search .............. 315/185 R, 315/209 R, 224–226, 291, 297, 307, 308, 315/312; 374/1, 163, 185, E12.001, E07.001, 374/E07.028, E1.001, E0.001, E0.0285
See application file for complete search history.

(56) References Cited

U.S. PATENT DOCUMENTS

| 4,085,403 A | 4/1978 | Meier et al. |
| 4,529,949 A | 7/1985 | De Wit et al. |
| 4,633,161 A | 12/1986 | Callahan |
| 5,291,607 A | 3/1994 | Ristic et al. |
| 5,334,916 A * | 8/1994 | Noguchi ............ 315/309 |
| 5,401,099 A | 3/1995 | Nishizawa et al. |
| 5,485,576 A | 1/1996 | Fee et al. |
| 5,506,490 A | 4/1996 | DeMuro |
| 5,546,041 A | 8/1996 | Szajda |
| 5,783,909 A | 7/1998 | Hochstein |
| 5,925,990 A | 7/1999 | Crouse et al. |
| 6,153,985 A | 11/2000 | Grossman |
| 6,332,710 B1 | 12/2001 | Aslan et al. |
| 6,351,079 B1 | 2/2002 | Willis |

(Continued)

FOREIGN PATENT DOCUMENTS

| CN | 2924996 | 7/2007 |
| DE | 19725710 | 1/1998 |

(Continued)

OTHER PUBLICATIONS

International Search Report and Written Opinion for International Application No. PCT/US2010/020819, date of mailing Aug. 13, 2010, 10 pages.

(Continued)

*Primary Examiner* — Douglas W Owens
*Assistant Examiner* — Thai Pham
(74) *Attorney, Agent, or Firm* — Bingham McCutchen LLP

(57) ABSTRACT

A control system is disclosed for determining an actual temperature of a light emitting diode. The control system uses conductor that supply power to the light emitting diode to supply a pulse to the light emitting diode. The pulse is determined along with a reaction caused by the pulse and the information gained is used in determination of the light emitting diode die temperature which can then be used in controlling current to the light emitting diode to control the temperature of the light emitting diode.

50 Claims, 13 Drawing Sheets

U.S. PATENT DOCUMENTS

| | | | |
|---|---|---|---|
| 6,382,812 B1 | 5/2002 | Hsu | |
| 6,693,394 B1* | 2/2004 | Guo et al. | 315/291 |
| 6,713,974 B2 | 3/2004 | Patchornik et al. | |
| 6,762,629 B2 | 7/2004 | Tam et al. | |
| 6,842,668 B2 | 1/2005 | Carson et al. | |
| 6,870,325 B2 | 3/2005 | Bushell et al. | |
| 6,930,737 B2 | 8/2005 | Weindorf et al. | |
| 7,029,145 B2 | 4/2006 | Frederick | |
| 7,034,507 B2 | 4/2006 | Lovett | |
| 7,049,765 B1 | 5/2006 | Tremaine, Sr. | |
| 7,119,498 B2 | 10/2006 | Baldwin et al. | |
| 7,126,290 B2 | 10/2006 | Elliot | |
| 7,150,561 B1 | 12/2006 | D'Aquino et al. | |
| 7,196,481 B2 | 3/2007 | Bushell et al. | |
| 7,204,638 B2 | 4/2007 | Hsu | |
| 7,233,258 B1 | 6/2007 | Gelinas | |
| 7,242,150 B2 | 7/2007 | DeJonge et al. | |
| 7,245,089 B2 | 7/2007 | Yang | |
| 7,245,090 B2 | 7/2007 | Yang | |
| 7,262,559 B2 | 8/2007 | Tripathi et al. | |
| 7,286,123 B2 | 10/2007 | Yang | |
| 7,322,718 B2 | 1/2008 | Setomoto et al. | |
| 7,330,002 B2 | 2/2008 | Joung | |
| 7,336,434 B2* | 2/2008 | Lille et al. | 360/6 |
| 7,358,679 B2 | 4/2008 | Lys et al. | |
| 7,423,750 B2 | 9/2008 | Hoshizaki et al. | |
| 7,429,129 B2 | 9/2008 | St. Pierre et al. | |
| 7,492,108 B2 | 2/2009 | Garcia et al. | |
| 7,504,781 B2* | 3/2009 | Wendt et al. | 315/291 |
| 7,504,783 B2 | 3/2009 | Zarr | |
| 7,507,001 B2 | 3/2009 | Kit | |
| 7,546,473 B2 | 6/2009 | Newman | |
| 7,556,423 B2 | 7/2009 | Caliboso | |
| 7,626,346 B2 | 12/2009 | Scilla | |
| 7,628,507 B2 | 12/2009 | Allen et al. | |
| 7,635,957 B2 | 12/2009 | Tripathi et al. | |
| 7,656,307 B2 | 2/2010 | Yatsuda et al. | |
| 7,656,371 B2 | 2/2010 | Shimizu et al. | |
| 7,663,326 B2 | 2/2010 | Santo et al. | |
| 7,728,401 B2 | 6/2010 | Takatori | |
| 7,755,513 B2 | 7/2010 | Wang et al. | |
| 7,777,430 B2 | 8/2010 | Catalano et al. | |
| 7,791,326 B2 | 9/2010 | Dahlman et al. | |
| 7,792,167 B2 | 9/2010 | Kanesaka | |
| 7,800,316 B2 | 9/2010 | Haug | |
| 7,800,567 B2 | 9/2010 | Fujino | |
| 7,812,551 B2 | 10/2010 | Hite et al. | |
| 7,817,009 B2 | 10/2010 | Wang et al. | |
| 7,888,623 B2* | 2/2011 | Kawashima et al. | 250/205 |
| 7,888,877 B2 | 2/2011 | Tsai et al. | |
| 7,888,942 B2* | 2/2011 | Chen et al. | 324/414 |
| 7,892,870 B2 | 2/2011 | Shi | |
| 7,911,156 B2 | 3/2011 | Cottongim et al. | |
| 7,911,438 B2 | 3/2011 | Okazaki | |
| 7,947,947 B2 | 5/2011 | Ackermann et al. | |
| 7,948,190 B2 | 5/2011 | Grajcar | |
| 7,948,398 B2 | 5/2011 | Miller | |
| 7,986,112 B2 | 7/2011 | West | |
| 7,990,077 B2 | 8/2011 | Yu et al. | |
| 7,994,725 B2 | 8/2011 | Bouchard | |
| 2002/0048177 A1 | 4/2002 | Rahm et al. | |
| 2003/0015973 A1* | 1/2003 | Ovens et al. | 315/291 |
| 2003/0123521 A1 | 7/2003 | Luoma | |
| 2004/0164688 A1 | 8/2004 | Van Tichelen et al. | |
| 2005/0057184 A1 | 3/2005 | Kaneko et al. | |
| 2006/0038661 A1 | 2/2006 | Reinhold et al. | |
| 2006/0119288 A1 | 6/2006 | Ayala et al. | |
| 2006/0125773 A1 | 6/2006 | Ichikawa et al. | |
| 2006/0214876 A1 | 9/2006 | Jendbro et al. | |
| 2006/0237636 A1 | 10/2006 | Lyons et al. | |
| 2006/0238169 A1 | 10/2006 | Baker | |
| 2007/0040518 A1 | 2/2007 | Young | |
| 2007/0057902 A1 | 3/2007 | Joung et al. | |
| 2007/0121324 A1 | 5/2007 | Nakano | |
| 2007/0285031 A1* | 12/2007 | Shteynberg et al. | 315/294 |
| 2007/0291483 A1 | 12/2007 | Lys | |
| 2008/0018261 A1 | 1/2008 | Kastner | |
| 2008/0062070 A1 | 3/2008 | De Oto et al. | |
| 2008/0088557 A1 | 4/2008 | Choi | |
| 2008/0111505 A1 | 5/2008 | Wang et al. | |
| 2008/0151965 A1 | 6/2008 | Kim | |
| 2008/0198613 A1 | 8/2008 | Cruickshank | |
| 2008/0204884 A1 | 8/2008 | Jang | |
| 2008/0231198 A1 | 9/2008 | Zarr | |
| 2008/0238340 A1 | 10/2008 | Leung et al. | |
| 2008/0258636 A1 | 10/2008 | Shih et al. | |
| 2008/0287742 A1 | 11/2008 | St. George et al. | |
| 2008/0319690 A1 | 12/2008 | Meadows et al. | |
| 2009/0021178 A1 | 1/2009 | Furukawa et al. | |
| 2009/0021955 A1 | 1/2009 | Kuang et al. | |
| 2009/0097244 A1 | 4/2009 | Lan et al. | |
| 2009/0146584 A1 | 6/2009 | Ye et al. | |
| 2009/0154525 A1 | 6/2009 | Dai et al. | |
| 2009/0167203 A1 | 7/2009 | Dahlman et al. | |
| 2009/0179574 A1 | 7/2009 | Chang | |
| 2009/0179848 A1 | 7/2009 | Schmidt et al. | |
| 2009/0212736 A1 | 8/2009 | Baarman et al. | |
| 2009/0251059 A1 | 10/2009 | Veltman | |
| 2009/0267523 A1 | 10/2009 | Phillips | |
| 2009/0289965 A1 | 11/2009 | Kurokawa et al. | |
| 2009/0302783 A1 | 12/2009 | Wang et al. | |
| 2009/0306912 A1 | 12/2009 | Chen et al. | |
| 2010/0007588 A1 | 1/2010 | Zygmunt et al. | |
| 2010/0033095 A1 | 2/2010 | Sadwick | |
| 2010/0033112 A1 | 2/2010 | Yen | |
| 2010/0039049 A1 | 2/2010 | Hoffman | |
| 2010/0066270 A1 | 3/2010 | Yang et al. | |
| 2010/0118057 A1 | 5/2010 | Atkins et al. | |
| 2010/0134020 A1 | 6/2010 | Peng et al. | |
| 2010/0157583 A1 | 6/2010 | Nakajima | |
| 2010/0176734 A1* | 7/2010 | Haubmann | 315/185 R |
| 2010/0194368 A1 | 8/2010 | Taylor et al. | |
| 2010/0203465 A1 | 8/2010 | Bria et al. | |
| 2010/0244701 A1 | 9/2010 | Chen et al. | |
| 2010/0259191 A1 | 10/2010 | Ghanem et al. | |
| 2010/0264795 A1 | 10/2010 | Miao | |
| 2010/0277077 A1 | 11/2010 | Pong et al. | |
| 2010/0295474 A1 | 11/2010 | Chemel et al. | |
| 2010/0295688 A1 | 11/2010 | Wu et al. | |
| 2010/0320939 A1 | 12/2010 | Lai | |
| 2011/0001438 A1 | 1/2011 | Chemel et al. | |
| 2011/0019430 A1 | 1/2011 | Wilkinson et al. | |
| 2011/0031903 A1 | 2/2011 | Nguyen Hoang et al. | |
| 2011/0043120 A1 | 2/2011 | Panagotacos et al. | |
| 2011/0062895 A1 | 3/2011 | Ji | |
| 2011/0068715 A1 | 3/2011 | Hum | |
| 2011/0080099 A1 | 4/2011 | Teng et al. | |
| 2011/0089852 A1 | 4/2011 | Segan | |
| 2011/0109231 A1 | 5/2011 | Shiu et al. | |
| 2011/0115396 A1 | 5/2011 | Horvath et al. | |
| 2011/0115400 A1 | 5/2011 | Harrison et al. | |
| 2011/0115645 A1 | 5/2011 | Hall et al. | |
| 2011/0121751 A1 | 5/2011 | Harrison et al. | |
| 2011/0121760 A1 | 5/2011 | Harrison et al. | |
| 2011/0147466 A1 | 6/2011 | Kang et al. | |
| 2011/0150028 A1 | 6/2011 | Nguyen Hoang et al. | |
| 2011/0156593 A1 | 6/2011 | De Greef et al. | |
| 2011/0157238 A1 | 6/2011 | Lin et al. | |
| 2011/0163696 A1 | 7/2011 | Huang et al. | |
| 2011/0199013 A1 | 8/2011 | Cottrell | |

FOREIGN PATENT DOCUMENTS

| | | |
|---|---|---|
| EP | 0492117 | 7/1992 |
| EP | 0 657 697 | 6/1995 |
| EP | 0923274 | 6/1999 |
| EP | 1313353 | 5/2003 |
| EP | 1 701 589 | 9/2006 |
| EP | 2 073 607 | 6/2009 |
| EP | 2273851 | 1/2011 |
| GB | 2335334 | 9/1999 |
| JP | 57133685 | 8/1982 |
| JP | 2003188415 | 7/2003 |
| JP | 2003317979 | 11/2003 |
| JP | 2009083590 | 4/2009 |
| KR | 2000006665 | 2/2000 |
| KR | 2006-098345 | 9/2006 |
| KR | 20070053818 | 5/2007 |

| | | |
|---|---|---|
| WO | WO-90/10238 | 9/1990 |
| WO | WO-9900650 | 1/1999 |
| WO | WO-00/17728 | 3/2000 |
| WO | WO-2005/081591 | 9/2005 |
| WO | WO-2006/058418 | 6/2006 |
| WO | WO 2007147573 A1 * | 12/2007 |
| WO | WO-2009/055821 | 4/2009 |
| WO | WO-2009/079944 | 7/2009 |
| WO | WO-2011/044040 | 4/2011 |
| WO | WO-2011/056242 | 5/2011 |

OTHER PUBLICATIONS

International Search Report and Written Opinion mailed Feb. 6, 2012 for International Application No. PCT/US2011/051883 (12 pages).
International Preliminary Report on Patentability mailed Jul. 28, 2011 for International Application No. PCT/US2010/020819 (7 pages).

* cited by examiner

METHOD AND DEVICE FOR REMOTE SENSING AND CONTROL OF LED LIGHTS

RELATED APPLICATIONS

The present application claims priority from U.S. Provisional Application Ser. No. 61/144,408, filed on Jan. 13, 2009, which is incorporated herein by reference.

BACKGROUND

An increasing number of light fixtures are utilizing light emitting diodes (LEDs) as light sources to increased efficiency and provide a longer operational lifetime over conventional incandescent light sources. While designers using incandescent light sources have had decades to work out problems, LEDs are relatively new and still present some issues that need to be resolved before gaining wide acceptance. One such issue involves the reaction of LEDs to heat. LEDs require a relatively low constant temperature in comparison to incandescent light sources or bulbs. A typical operating temperature of an incandescent filament is over 2,000 degrees Celsius. An LED may have a maximum operating temperature of approximately 150 degrees Celsius, and operation above this maximum can cause a decrease in the operational lifetime of the LED. The decrease in light output is caused at least in part by carrier recombination processes at higher temperatures and a decrease in the effective optical bandgap of the LED at these temperatures. A typical operating temperature of an LED is usually below about 100 degrees Celsius to preserve operational lifetime while maintaining acceptable light output.

Multiple LEDs are typically grouped together in each light fixture to provide the amount of light output necessary for lighting a room in a home or building. LEDs used in light fixtures are typically considerably higher in light output and power consumption than the typical colored indicator LED seen in many electronic devices. This increase in the LED density and power causes an increase in heat buildup in the fixture. In LEDs, an increase in temperature causes an increase in current which, consequently, causes a further increase in temperature. If left unchecked, the increased current caused by increased temperature can cause thermal runaway where the temperature increases to a point where the LED is damaged. Therefore, it is important to control the power supplied to the LEDs to ensure that the temperature of the LEDs does not exceed the maximum safe operating temperature. Controlling the power to the LED can generally be accomplished by controlling the current or controlling the voltage, although light output is directly related to current.

Incandescent and fluorescent lighting fixtures in buildings are usually supplied by a line or mains voltage, such as 115 Volts AC at 60 Hertz in the United States. Other single phase voltages are also used, such as 277 Volts AC, and in some instances other single and multiple phase voltages are used as well as other frequencies, such as in Britain where 220 Volts at 50 Hz is common. Power to these lighting fixtures is controlled by a wall mounted switch for an on or off operation, and a dimmer switch can be used to control brightness levels in addition to providing a simple on and off function.

LEDs in light fixtures operate on a much lower voltage than what is typically supplied to a building. LEDs require low voltage DC so supply power must be converted from higher voltage AC to DC constant current. Generally a single white LED will require a forward voltage of less than approximately 3.5 Volts. It is also important to control current to the LED since excessive current can destroy the LED and changes in current can lead to undesirable changes in light output.

Some conventional LED lighting systems use thermocouples or thermistors to measure temperatures of the LEDs. These devices are placed in a position near the LED and are connected to a temperature monitoring system using set of wires that are in addition to the wires powering the LED. These temperature detection devices cannot directly measure the actual temperature of the LED die itself since they necessarily have to be spaced apart from the LED die because of optics of the LEDs and the LED conductors. In addition, the extra set of wires between the thermistor and the monitoring system can be inconvenient, especially if the monitoring system is a significant distance from the thermistor. Because the thermistors do not directly measure the actual temperature of the LED die, these devices introduce some particular inaccuracies into the temperature measurement.

SUMMARY

The present invention overcomes the limitations of conventional LED temperature measurement devices by providing a method and device for measuring an actual temperature of the LED not an approximation based on a temperature near the LED.

In one embodiment, according to the present disclosure, a method for determining a temperature of at least one light emitting diode (LED) in a circuit is disclosed. The circuit includes a power supply for powering the LED through first and second LED conductors by providing an operating current through the LED conductors and an operating voltage across the LED conductors. The LED is operable to generate light in response to receiving the operating current in a range of operating currents and receiving the operating voltage in a range of operating voltages. An operating current and operating voltage are provided to the LED through the first and second LED conductors. A current pulse is superimposed on the operating current to the LED, through the first and second LED conductors resulting in a voltage pulse that is superimposed on the operating voltage. The voltage pulse is sensed across the first and second LED conductors resulting from the applied pulse of current to determine a voltage magnitude of the voltage pulse. A current magnitude of the current pulse is determined, and the operating temperature of the LED is determined based on the current magnitude of the current pulse and the voltage magnitude of the voltage pulse.

In another embodiment, a method for determining a temperature near at least one light emitting diode (LED) in a circuit is disclosed. The circuit includes a power supply for powering the LED through first and second LED conductors to cause the LED to operate to generate light when a forward operating voltage and forward operating current is supplied to the LED through the LED conductors. The LED exhibits a forward voltage resistance when the forward operating voltage is supplied to the LED through the LED conductors and the LED exhibits a reverse bias voltage resistance when a reverse bias voltage is supplied to the LED through the LED conductors. The reverse bias voltage resistance is greater than the forward voltage resistance. A thermistor is arranged across the first and second LED conductors in parallel with the LED. The thermistor has an effective resistance range in which at least two different thermistor resistances of the thermistor correspond to at least two different thermistor temperatures of the thermistor. The thermistor resistances in the effective resistance range are lower than the reverse bias voltage resistance of the LED and are higher than the forward voltage resistance of the LED. An effective resistance range is selected such that, when a forward drive current is applied to the LED conductors, one portion of the forward drive current which flows through the LED is the forward operating current and another portion of the forward drive current which flows through the thermistor is a forward thermistor current which is smaller than the forward operating current. When the reverse bias voltage is supplied to the LED conductors, a reverse drive current flows through the LED conductors in an opposite direction than the forward drive current and one portion of the reverse drive current flows as a leakage current through the LED and which does not cause the LED to produce light and another portion of the reverse drive current flows through the thermistor as a reverse thermistor current which is larger than the leakage current. The thermistor is positioned in a thermal pathway of the LED to receive heat produced by the LED during operation of the LED. The temperature of the thermistor is measurable by determining the thermistor resistance using the reverse thermistor current and the temperature of the thermistor is related to a temperature of the LED.

Another embodiment involves a switch assembly for electrical communication with at least one light emitting diode (LED) assembly to control the LED assembly. The LED assembly has at least one LED with a first LED conductor and a second LED conductor and which is powered by receiving an operating current through the LED conductors in a range of operating currents and an operating voltage across the LED conductors in a range of operating voltages. The LED assembly is configured to be fixedly installed remotely from the switch assembly to provide light. A transformer is included for electrically connecting to a line power source for receiving line power with a line voltage greater than 100 Volts AC and converting the line voltage to a transformed power with a transformed voltage that is less than 50 Volts. A power controller is included for receiving the transformed power from the transformer and for at least creating an operating power with the operating current in the range of operating currents and the operating voltage in the range of operating voltages. The power controller is arranged to electrically connect to the LED assembly through the LED conductors to supply the operating current and operating voltage to the LED assembly through the LED conductors. A temperature monitor is included for electrically connecting to the LED conductors. The temperature monitor includes a current sensor to determine a magnitude of current through the LED conductors and a voltage sensor to determine a magnitude of voltage across the LED conductors. The temperature monitor also includes a controller that is electrically connected with the current and voltage sensors and is configured for calculating a temperature of the LED in the LED assembly based at least partially on the determined current and voltage magnitudes. A switch is also included for selectively connecting and disconnecting the operating current and operating voltage from the LED assembly.

In yet another embodiment, a control system is disclosed for determining a temperature of at least one light emitting diode (LED) in a circuit which includes a power supply for powering the LED through first and second LED conductors by providing an operating current through the LED conductors and an operating voltage across the LED conductors. The LED is operable to generate light in response to receiving the operating current in a range of operating currents and receiving the operating voltage in a range of operating voltages. The control system includes a power supply for providing the operating current and operating voltage to the LED through the first and second LED conductors. The power supply is used in superimposing a current pulse on the operating current to the LED, through the first and second LED conductors resulting in a voltage pulse that is superimposed on the operating voltage. A voltage sensor is included for sensing the voltage pulse across the first and second LED conductors resulting from the applied pulse of current to determine a voltage magnitude of the voltage pulse. A current sensor is included for determining a current magnitude of the current pulse. A controller is included for determining the operating temperature of the LED at the provided operating current based on the current magnitude of the current pulse and the voltage magnitude of the voltage pulse.

In another embodiment, a control system is disclosed for determining a temperature near at least one light emitting diode (LED) in a circuit. The circuit includes a power supply for powering the LED through first and second LED conductors to cause the LED to operate to generate light when a forward operating voltage and forward operating current is supplied to the LED through the LED conductors. The LED exhibits a forward voltage resistance when the forward operating voltage is supplied to the LED through the LED conductors and the LED exhibits a reverse bias voltage resistance when a reverse bias voltage is supplied to the LED through the LED conductors. The reverse bias voltage resistance is greater than the forward voltage resistance. The control system includes a thermistor that is electrically connected across the first and second LED conductors in parallel with the LED. The thermistor has an effective resistance range in which at least two different thermistor resistances of the thermistor correspond to at least two different thermistor temperatures of the thermistor. The thermistor resistances in the effective resistance range are lower than the reverse bias voltage resistance of the LED and are higher than the forward voltage resistance of the LED. The effective resistance range is such that, when a forward drive current is applied to the LED conductors, one portion of the forward drive current which flows through the LED is the forward operating current and another portion of the forward drive current which flows through the thermistor is a forward thermistor current which is smaller than the forward operating current. When the reverse bias voltage is supplied to the LED conductors, a reverse drive current flows through the LED conductors in an opposite direction than the forward drive current and one portion of the reverse drive current flows as a leakage current through the LED and which does not cause the LED to produce light and another portion of the reverse drive current flows through the thermistor as a reverse thermistor current which is larger than the leakage current. The thermistor is positioning in a thermal pathway of the LED to receive heat produced by the LED during operation of the LED. The temperature of the thermistor is measurable by determining the reverse thermistor current and the temperature of the thermistor is related to a temperature of the LED.

In another embodiment, a method is disclosed for electrically communicating with at least one light emitting diode (LED) assembly to control the LED assembly. The LED assembly having at least one LED with a first LED conductor and a second LED conductor. The LED is powered by receiving an operating current through the LED conductors in a range of operating currents and an operating voltage across the LED conductors in a range of operating voltages. The LED assembly is configured to be fixedly installed to provide light. The method includes transforming a line power source with a line voltage greater than 100 Volts AC and converting the line voltage to a transformed power with a transformed voltage that is less than 50 Volts. The transformed power is received and an operating power is created with the operating current in the range of operating currents and the operating voltage in the range of operating voltages. The operating current and operating voltage is selectively supplied to the LED assembly through the LED conductors to control light output of the LED assembly. A temperature of the LED is determined through the LED conductors at least partially by determining a magnitude of current through the LED conductors and determining a magnitude of voltage across the LED conductors.

BRIEF DESCRIPTION OF THE DRAWINGS

The present invention may be understood by reference to the following detailed description taken in conjunction with the drawings, in which.

DETAILED DESCRIPTION

Figure 1:
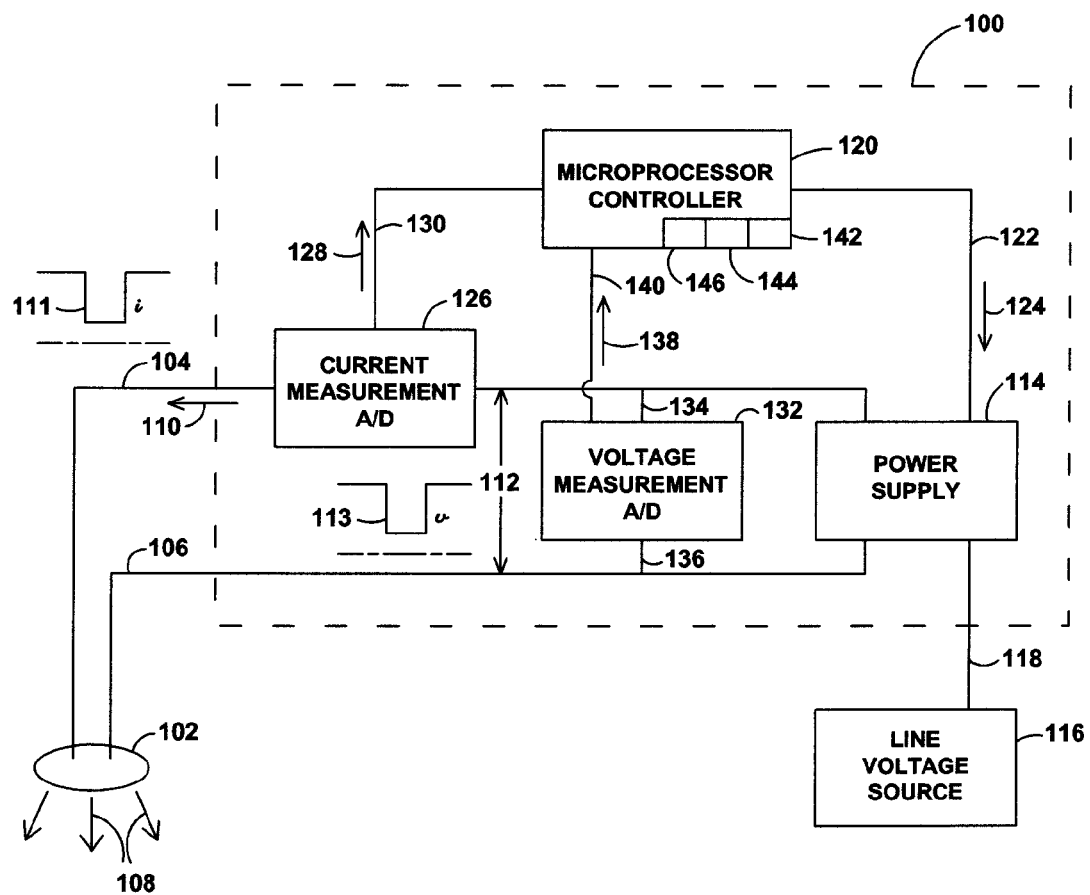
FIG. 1 is a block diagram of a control system for determining a temperature of a light emitting diode.

While this invention is susceptible to embodiment in many different forms, there are shown in the drawings, and will be described herein in detail, specific embodiments thereof with the understanding that the present disclosure is to be considered as an exemplification of the principles of the invention and is not to be limited to the specific embodiments described. Descriptive terminology such as, for example, uppermost/lowermost, right/left, front/rear and the like has been adopted for purposes of enhancing the reader's understanding, with respect to the various views provided in the figures, and is in no way intended as been limiting.

Referring to the drawings, wherein like components may be indicated by like reference numbers throughout the various figures, FIG. 1 illustrates one embodiment of a light emitting diode (LED) control system, indicated by the reference number 100 within a dashed line. Control system 100 is electrically connected to an LED 102 using a first LED conductor 104 and a second LED conductor 106. LED 102 is operable to produce light, represented by arrows 108, when the LED receives an operating current 110 through the LED conductors in a range of operating currents and receives an operating voltage 112 in a range of operating voltages across the LED conductors. In the present embodiment, control system 100 includes a power supply 114 which is connected to a line power source 116 through line conductors 118. The utility power source provides an AC line voltage at a typical line voltage, such as 110 Volts RMS, to power supply 114. Power supply 114 converts the utility power to the operating voltage in the range of operating voltages and applies the operating voltage to the LED conductors. Power supply 114 also converts the utility power to operating current 110 in the range of operating currents and applies the operating current to the LED conductors.

A separate transformer (not shown in FIG. 1) can be used for transforming the line power from the line voltage source to a transformed power. In this instance, the power supply receives the transformed power from the transformer and produces the operating current and operating voltage as discussed.

Power supply 114 can be controlled by a controller 120 through a control line 122. Controller 120 provides a current control signal 124 which controls the amount or magnitude of the operating current applied to the LED conductors. The amount of light produced by the LED is directly related to the amount of operating current that the LED receives. Therefore, by controlling the operating current, the controller can control the amount of light produced by the LED. Controller 120 can be connected to a current measurement analog to digital (A/D) converter 126 or other current sensor which detects the magnitude of the operating current and produces a current sensed signal 128 that is supplied to the controller through a current sensed signal line 130. Using the current sensed signal, the controller can determine the present level of the operating current and can change current control signal 124 to adjust the magnitude of the operating current. As an alternative or in addition to sensing the current with the current sensor, the current can be determined by producing the current at a known magnitude.

A voltage measurement A/D converter 132 or other voltage sensor is connected between the first and second LED conductors using voltage sensor conductors 134 and 136. Converter 132 detects the voltage across the LED conductors and produces a voltage sensed signal 138 on a voltage sensed signal line 140. The voltage sensed signal line is connected to controller 120, which receives the voltage sensed signal 138 and can determine the operating voltage that is supplied to LED 102. It should be noted that while LED 102 is presently discussed as a single LED, many of the concepts and embodiments are applicable to multiple LED's as well. Specific examples of multiple LED systems will also be discussed below.

Controller 120 can include a processor 142, a clock 144 and a memory 146 along with software, not specifically shown, which enables the controller to determine the operating current and the operating voltage based on the current sensed signal 128 and the voltage sensed signal 138, respectively. The software can be configured to operate the controller as required in view of the overall disclosure. Controller 120 can also store values of the operating current and voltage in the memory along with the times at which the stored values occurred, among other things.

Current flowing through the LED causes the LED to produce heat as well as light. The LED is operable at an operating temperature which is at a safe level if it remains below a maximum temperature. If the temperature exceeds the maximum temperature then the LED can be subject to thermal damage which can reduce the lifetime of the LED or cause rapid failure of the LED. In some instances, the heat causes an internal resistance of the LED to decrease which, in turn, increases the amount of current that flows through the LED which increases the heat produced. Left unchecked, the LED enters a condition of thermal runaway where the heat caused by the increased current which is caused by the heat eventually causes the temperature of the LED to exceed the maximum temperature and the LED fails.

In the present embodiment, control system 100 can determine the temperature of the LED based on electrical measurements through the two LED conductors. This allows the control system to set the operating current to prevent the LED from over heating as well as allowing for the determination of the operating lifetime of the LED, among other things.

Figure 2:
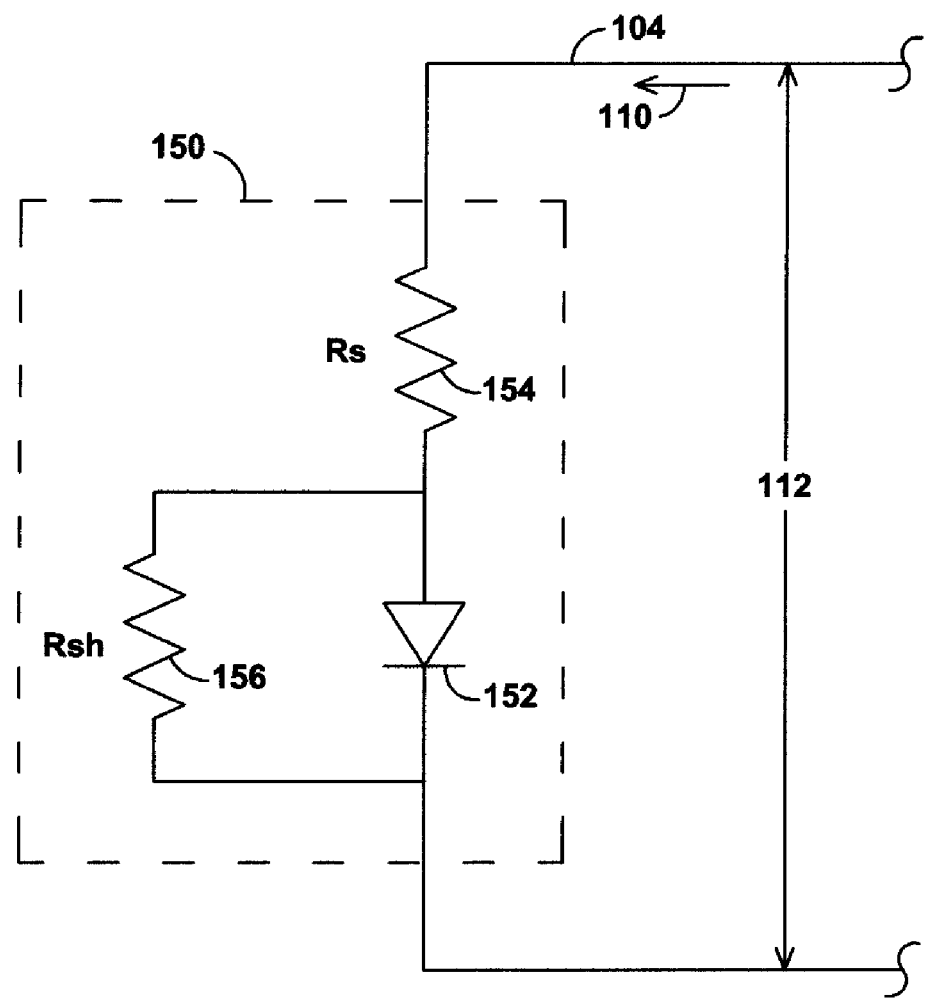
FIG. 2 is an equivalent circuit diagram of a light emitting diode used for determining the temperature of the light emitting diode.

Turning now to FIG. 2, a diode equivalent circuit 150 is shown connected to first LED conductor 104 and second LED conductor 106. In general, LED 102 can be represented by the diode equivalent circuit which includes a diode junction 152, a series resistance 154 and a shunt resistance 156. Using the diode equivalent circuit, operating current 104 can be determined by the following ideal diode equation:

$$I = I_o \exp\left[\frac{V - E_g}{AkT}\right].\quad\text{Equation 1}$$

Where I is the operating current flowing through the LED, $I_o$ is a constant depending on the LED properties, V is a voltage applied across the diode junction of the LED, $E_g$ is a value that is closely related to the optical band gap of the semiconductor at the diode junction referred to as the "effective" optical band gap, A is a constant known as the diode factor which is usually a value between 1 and 2, k is Boltzmann's constant and T is the temperature of the semiconductor diode junction in degrees Kelvin.

At relatively lower voltages, below about 1.5 to 2 volts, shunt resistance 156 of the equivalent circuit appears to dominate and the current-voltage-temperature behavior deviates from what is predicted by Equation 1. However, at these lower voltages the LED remains cool and produces little useful light. At relatively higher voltages, above about 2.5 volts, series resistance 154 appears to dominate and the current-voltage-temperature behavior deviates from Equation 1. These higher voltages are near the limit of LED operation.

The effective shunt resistance is a result of surface and junction imperfections while the series resistance results from sheet resistance of the semiconductor doped layers, contact resistance and the wires. In reverse bias, the effective shunt resistance is extremely high as the junction depletion width increases. This insulating layer allows for essentially no current flow through the reverse biased LED. In order to avoid the accumulation of destructive levels of electrostatic charge, a Zener diode (not shown) is usually placed across the diode to drain off current at voltages above about 5 volts.

Equation 1 describes the current, voltage and temperature operation of the LED to an acceptable level of accuracy within a range of operating voltages where the operating voltage is above where the shunt resistance dominates and below where the series resistance dominates. In one embodiment, this range is from about 1.5 V to about 2.5 V, however this range may be larger or smaller depending on characteristics of the LED. By knowing the values, other than T in Equation 1, the temperature of the actual diode die itself can be determined.

One of the values needed to determine the temperature is the effective optical band gap value, $E_g$. The effective optical band gap is nearly the same for all white LED's since most LED's use blue light to produce the white light, even when different semiconductor materials are used. In many white LED's, the blue or UV light is used to excite phosphor to produce white light in the white LED's. Applicant has empirically demonstrated with several commercial LED's that the effective optical band gap is 3.2 eV. The diode factor A is taken to be 2, which is usually a good assumption for LED's for diodes where junction recombination dominates. The effective band gap can also be determined for the LED by solving Equation 1 for $E_g$ if all of the other variables in Equation 1 are known.

Another value that can be determined is the series resistance 154. Given the limitations of series and shunt resistances, it can be important to measure the current voltage relationship in the proper range of values. By determining the series resistance the temperature can be determined below where the series resistance dominates and where an acceptable level of accuracy can be obtained. At high current the voltage applied to the LED drops across the diode as well as the series resistance. The actual diode voltage can be devolved from the total operating voltage 112 from the equivalent circuit shown in FIG. 2. The operating voltage, V at a measured current I is divided across the two circuit elements Rs and the diode 152 as follows in Equation 2 where Rs is the series resistance and Vd is the voltage across the diode.

$$V=IRs+Vd.\quad\text{Equation 2}$$

Because the series resistance Rs is a constant and does not vary, the exponential dependence of the diodes I-V relationship can be separated from the linear relationship of the series resistance by performing measurements at several different currents and voltages and solving for the diode's variables. Equation 2 can be solved for the diode voltage Vd=V−IRs which can then be substituted into Equation 1 to give the following Equation 3 for determining the series resistance.

$$I = I_o \exp\left[\frac{(V - IRs) - E_g}{AkT}\right].\quad\text{Equation 3}$$

Figure 3:
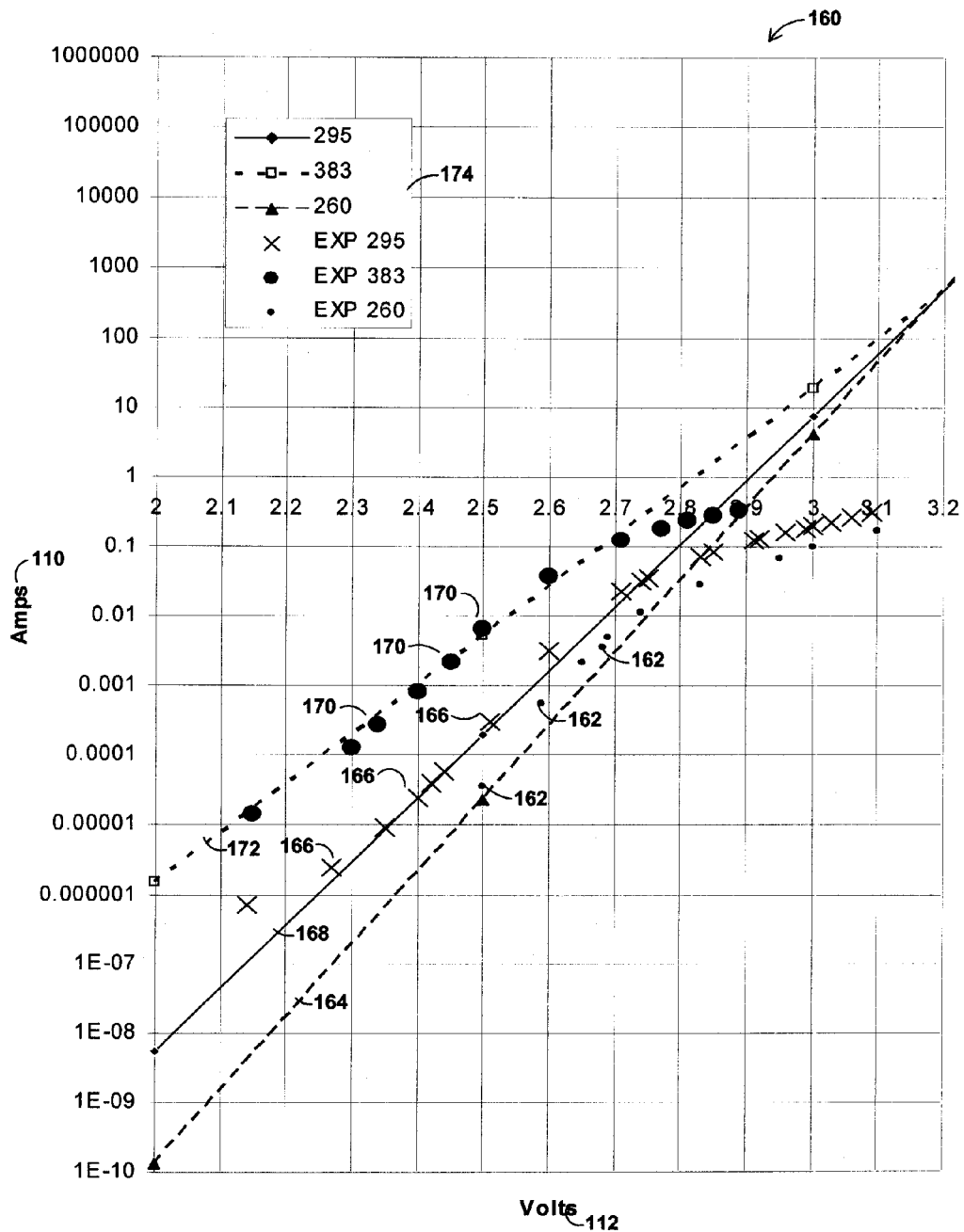
FIG. 3 is a graph of experimental and theoretical results for temperatures determined.

A comparison of experimental data with results obtained using Equation 1 is shown in a graph 160 in FIG. 3. Graph 160 shows a plot of a log of operating current 110 plotted against operating voltage 112 at three different experimental temperatures; 260 degrees Kelvin, 295 degrees Kelvin and 383 degrees Kelvin (hereinafter K). A value of $5 \times 10^2$ Amps was used in Equation 1 for $I_o$ to make the calculated data fit the experimental data. The experimental data was obtained by immersing the LED in a temperature controlled mineral oil bath while the data was taken. A thermocouple was welded to a metal slug of the LED to measure the temperature of the LED and oil bath and the operating current and operating voltage were measured.

The experimental results for the log current vs. voltage points at 260 K are shown by small circular dots, some of which are indicated by the reference number 162, the temperature curve of theoretical results obtained using Equation 1 for the temperature of 260 K are represented by dashed line 164. Data points for the experimental results of the current vs.

voltage at 295 K are shown as X's, some of which are indicated by the reference number 166. Solid line 168 is a temperature curve that shows the theoretical results obtained using Equation 1 with the 295 K temperature. The experimental results for current vs. voltage at 383 K are shown by circular dots, some of which are indicated by the reference number 170. A temperature curve of the theoretical results obtained using Equation 1 at 383 K are shown by dashed line 172. Key 174 also shows which information is experimental and which was obtained using Equation 1 for subsequently generating the three linear plots.

As shown in graph 160, at relatively higher currents and voltages the experimental current vs. voltage points deviate from those predicted by Equation 1. While not intending to be bound by theory, this may be at least partially due to the series resistance of the LED and may indicative of wasted power in the form of heat. It is likely that low temperature measurements are affected by self heating of the LED's. A reasonably accurate determination of temperature can be obtained by the theoretical results by using current and voltage that correspond to areas of the temperature curve where there is sufficient agreement between experimental and theoretical results.

As seen in graph 160, as the temperature is increased, the temperature curve moves to the left and the slope of the curve decreases. Therefore by determining a point on the graph of current and voltage of an LED, the temperature of the LED can be determined based on where the point falls on the graph. Also, by determining more than one point based on more than one current and voltage, the slope of the temperature curve can be determined which can then establish the temperature for the multiple points. Further, by using Equation 1, a given current and voltage can be used to determine a single temperature of the LED at a given time.

Control system 100 (FIG. 1) can determine the temperature of LED 102 through the two wire connection to the LED using the first and second LED conductors 104 and 106. Operating current 110 can be provided by power supply 114 at a known amplitude. Operating voltage 112 can be determined by voltage measurement A/D converter 132. Given this information along with Equation 1 as discussed above, controller 120 can determine the operating temperature of LED 102 based on current flow and voltage across the LED conductors. This allows the temperature of the LED to be determined from a location that is remote from the LED without the need for additional wires to connect to the LED. This also provides an accurate determination of the actual temperature of the LED die itself, not the temperature of the atmosphere around the LED as provided by a thermal detection device that is located in the thermal pathway of the LED.

In one embodiment, controller 120 controls power supply 114 to produce a pulse 111 of current that is superimposed on operating current 110 through the LED conductors. This current pulse can be produced at a known magnitude or the current can be accurately measured with current measurement A/D converter 126. Current pulse 111 is shown in the present example as a negative pulse which lowers the operating current while still keeping the operating current positive, but other pulse shapes can also be used. The current pulse causes voltage 112 to react with a corresponding voltage pulse 113 which can be measured using the voltage measurement A/D converter 132. Voltage pulse 113 is a temporary reduction in operating voltage that still maintains the forward bias across the LED. Controller 120 then uses the amplitudes of the current and voltage pulses to determine the temperature of the LED using Equation 1. A voltage pulse can be used in place of the current pulse. In this instance, the voltage pulse would be applied to the LED conductors at an amplitude that is either known or sensed and the resulting current pulse can be measured using the current measurement A/D converter. It should be understood that measurements of current or voltage pulses can be accomplished in a number of different ways in view of the recognitions that have been brought to light herein. In one embodiment, an average temperature of groups of LEDs that are arranged in series or parallel can be determined based on one or more current pulses through the LEDs.

The current pulse can be an increase or a decrease in the operating current, and the current pulse can also be in the shape of a ramp, triangle wave or other shape that provides more than one current. In the case where the current pulse includes a shape such as the ramp, the current pulse will provide more than one different current amplitude which, in response, will cause the voltage to exhibit more than one different voltage amplitude. These multiple corresponding currents and voltages can then be used to determine the temperature either based on points on a graph, such as graph 160, or based on a slope of a temperature curve. In one example, the current pulse can be used to put the corresponding sensed voltage in a voltage range, described above, between where the series resistance of the LED and the shunt resistance of the LED dominate. Multiple different pulses can also be used and the pulses can be produced at regular intervals, or based on the temperature determined or on other parameters. In some instances, power supplies can provide anomalies such as ripples in the current which can be used as the current pulse. Switching type power supplies are one example of these types of devices.

In one embodiment, the current pulse can be sufficiently short in duration such that any change in light output by the LED caused by the pulse is not perceivable by humans. This avoids any perceived flickering of the light level that would not be desirable in a lighting system that is used at least partially for illumination for human perception. High persistence phosphors can be used so that a longer pulse duration can be used. The longer pulse can improve the accuracy of the temperature determination by allowing for the use of a more accurate A/D converter which uses a longer sampling time and can average out random noises and other interference.

By determining the temperature of the LED, control system 100 can control the operating current to the LED so that the LED temperature is maintained at a safe operating temperature below which heat damage to the LED can occur. Controller 120 can be programmed with the maximum safe operating temperature of the LED and can compare the determined temperature with the safe operating temperature. The controller can raise or lower the operating current until the LED operates at a desired operating temperature. The controller can also provide other control functions.

The control system can also record the determined temperatures to a file in the memory along with the time of the temperature. In this way, the control system can keep a running tally of the operating temperature of the LED and time of operation of the LED to project the lifetime of the LED. The memory can be non-volatile memory so that the system can remember the temperature of the LED in the event of a brief power failure. When power is restored, this allows the control system to resume operation of the LED by setting the operating current based at least partially on the stored operating temperature. Operating current and/or operating voltage or other parameters can also be stored into memory for tracking other information regarding the LED. For instance, by tracking operating current, operating voltage and time, the control system can monitor power consumption of the LED. Overall operating time of the LED can be tracked by monitoring the time that operating current and/or operating voltage are applied to the LED.

Figure 4:
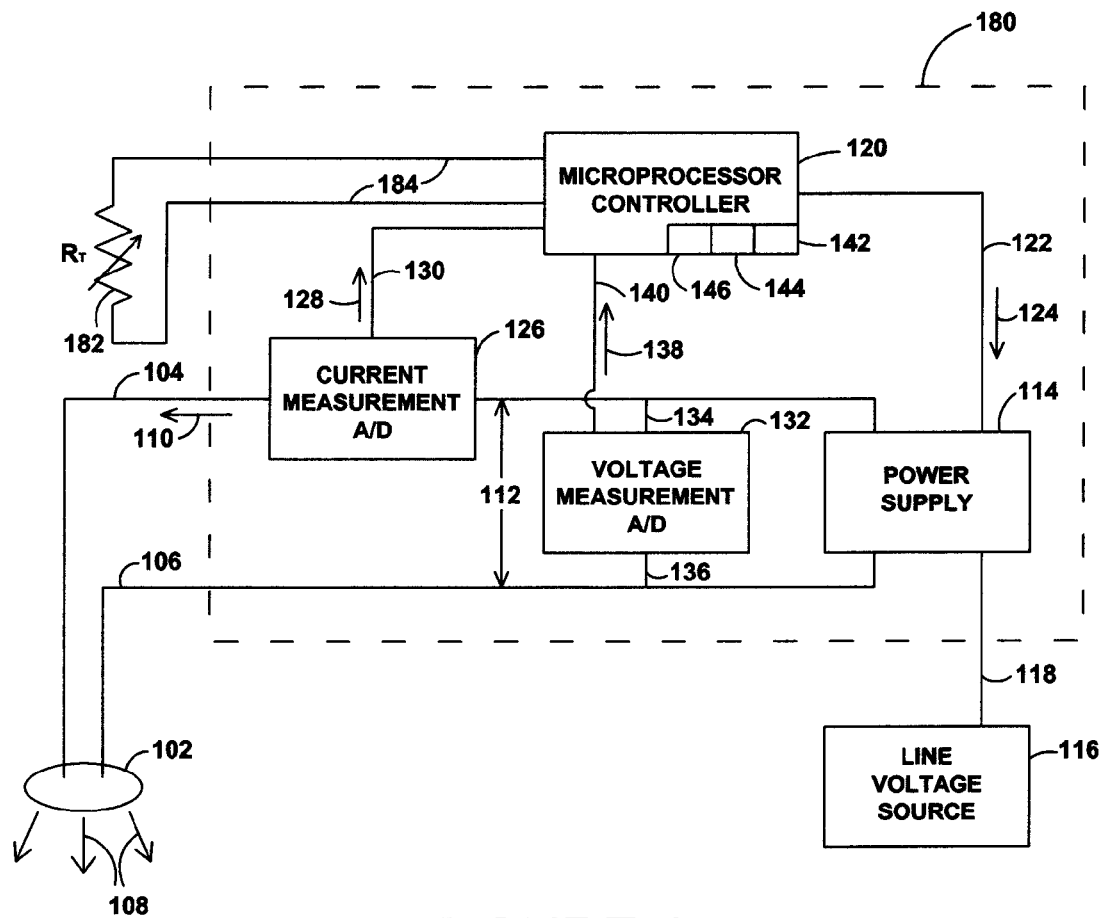
FIG. 4 is a block diagram of a circuit for determining an ambient temperature.

Yet another embodiment is illustrated in FIG. 4, where a control system 180 includes a connection with a thermistor 182. Thermistor 182 is electrically connected to controller 120 with thermistor conductors 184 so that the controller can determine a thermistor temperature at the location of the thermistor by determining a resistance of the thermistor. In the embodiment shown in FIG. 4, thermistor 182 is located remote from LED 102 but is in the same thermal environment as the LED. By being in the same environment, thermistor 182 and LED 102 are essentially at the same temperature prior to operation of the LED at startup or after the LED has had sufficient time to cool to the ambient temperature after operation. In this way, thermistor 182 can be used to determine a temperature of the LED. This operation could be conducted after the LED and control system are installed where they are to be used, or could be conducted during a manufacturing process prior to installation. Thermistor 182 can also be mounted near the LED and/or within the same enclosure as LED 102, such as within a light fixture. In this case, the thermistor conductors would reach from the controller to the location of the thermistor near the LED. Also, this allows the control system to be in a different thermal environment from the LED and thermistor.

Figure 5A:
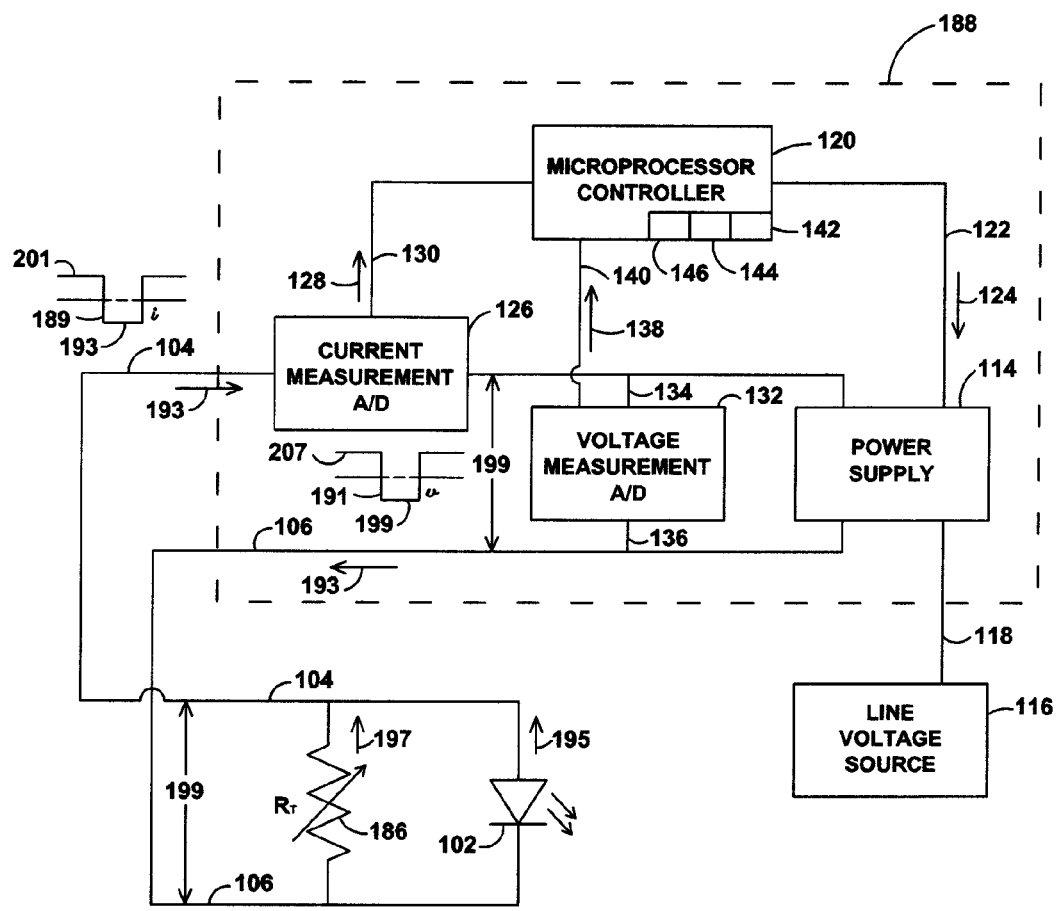
FIG. 5a is a block diagram of a circuit for determining an ambient temperature using conductors for powering the light emitting diode.
Figure 5B:
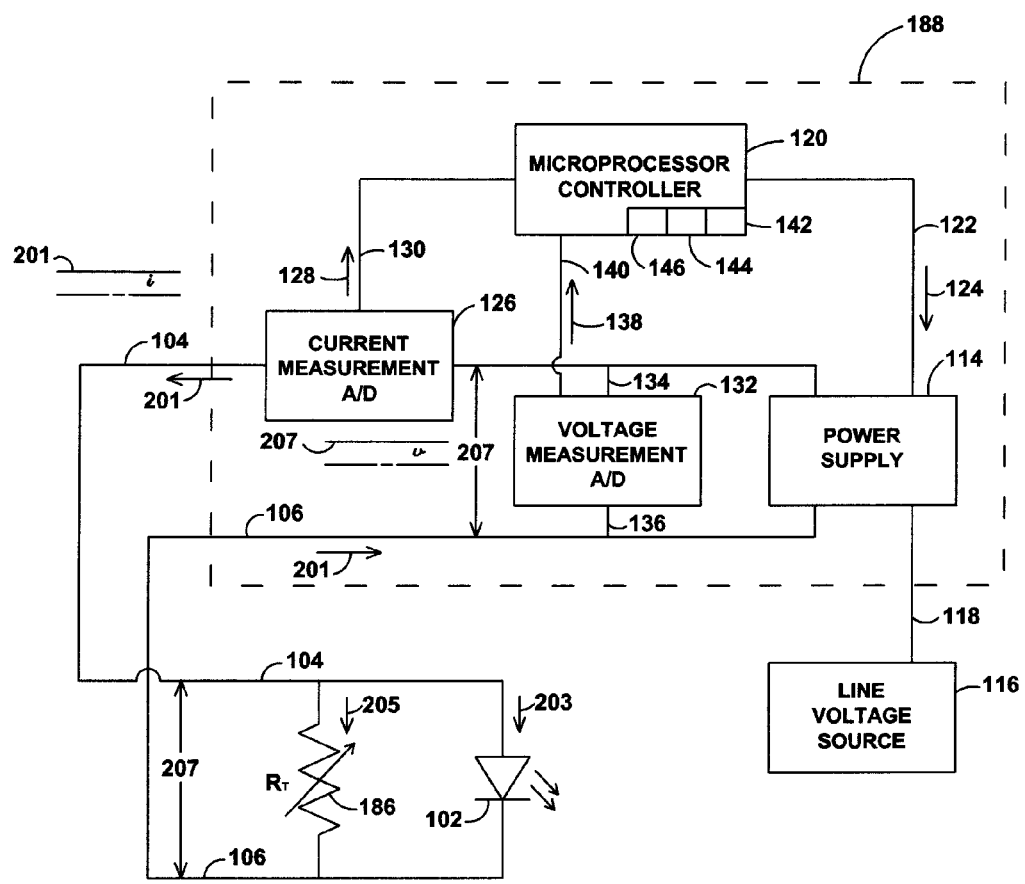
FIG. 5b is another block diagram of the circuit for determining an ambient temperature using conductors for powering the light emitting diode.

In another embodiment, shown in FIGS. 5a and 5b, a thermistor 186 is electrically connected in parallel with LED 102 and is positioned in a thermal pathway to receive heat from the LED. Thermistor 186 is chosen to have an effective resistance range that is lower than an effective resistance of the LED when reverse biased. At a reverse bias voltage, up to about −5 Volts, the reverse bias resistance of the LED is extremely high. The thermistor can also be chosen to have a forward voltage bias resistance that is much higher than an effective forward voltage resistance of the LED. As shown in FIG. 5a, a control system 188 can apply a current pulse 189 to the LED conductors such that a reverse bias voltage pulse 191 is created and a reverse bias voltage 199 is seen across the LED. The current pulse 189 causes a reverse drive current 193 in the LED conductors. One portion of the reverse drive current flows through the LED as a leakage current 195 which does not cause the LED to produce light. Another portion of the reverse drive current flows through the thermistor as a reverse thermistor current 197.

By selecting the resistance range of the thermistor to be small enough in comparison to the reverse bias resistance of the LED, the leakage current flow through the LED is insignificant compared with the reverse thermistor current flow through the thermistor and therefore the leakage current can be ignored while still gaining a reasonably accurate temperature measurement from the thermistor. When determined at startup or when the LED is at ambient temperature, the temperature of the thermistor is the same as the LED temperature. Connecting the thermistor in parallel with the LED allows the thermistor to be positioned with the LED and away from the control system while maintaining the advantage of only using the two LED conductors for powering the LED and for temperature determination.

Operation of the LED to produce light is shown in FIG. 5b where a forward drive current 201 is applied to the LED conductors. Forward drive current 201 includes one portion which flows through the LED and is referred to as the forward operating current 203 and another portion that flows through the thermistor which is referred to as a forward thermistor current 205. The forward drive current produces a forward operating voltage 207 across the LED.

By determining an ambient temperature of the LED, applying a current pulse to the LED, determining a magnitude of the current pulse and the resulting magnitude of voltage pulse, the controller has three variables; current, voltage and temperature, that can be used in Equation 1. Using the values determined for these variables, and supplying known or estimated values for other parameters, the controller can solve Equation 1 for any one of the remaining parameters. For instance, knowing the operating current, operating voltage, temperature, $I_o$ and the diode factor A, the controller can calculate the effective band gap $E_g$. By knowing the other variables, the diode factor can be calculated. The thermistor temperature can also be used in a calibration procedure to increase the accuracy in later determining the temperature using the operating current and operating voltage. The thermistor can be included in the diode package along with the LED die and in some cases a zener diode.

As can be understood by the present disclosure, the control system of the several embodiments disclosed can be located remotely from the LED or within the same enclosure as the LED, such as within a light fixture. One or more components of the control system can also be arrange on one or more integrated circuits which can be included in a single LED package along with the LED die.

Figure 6:
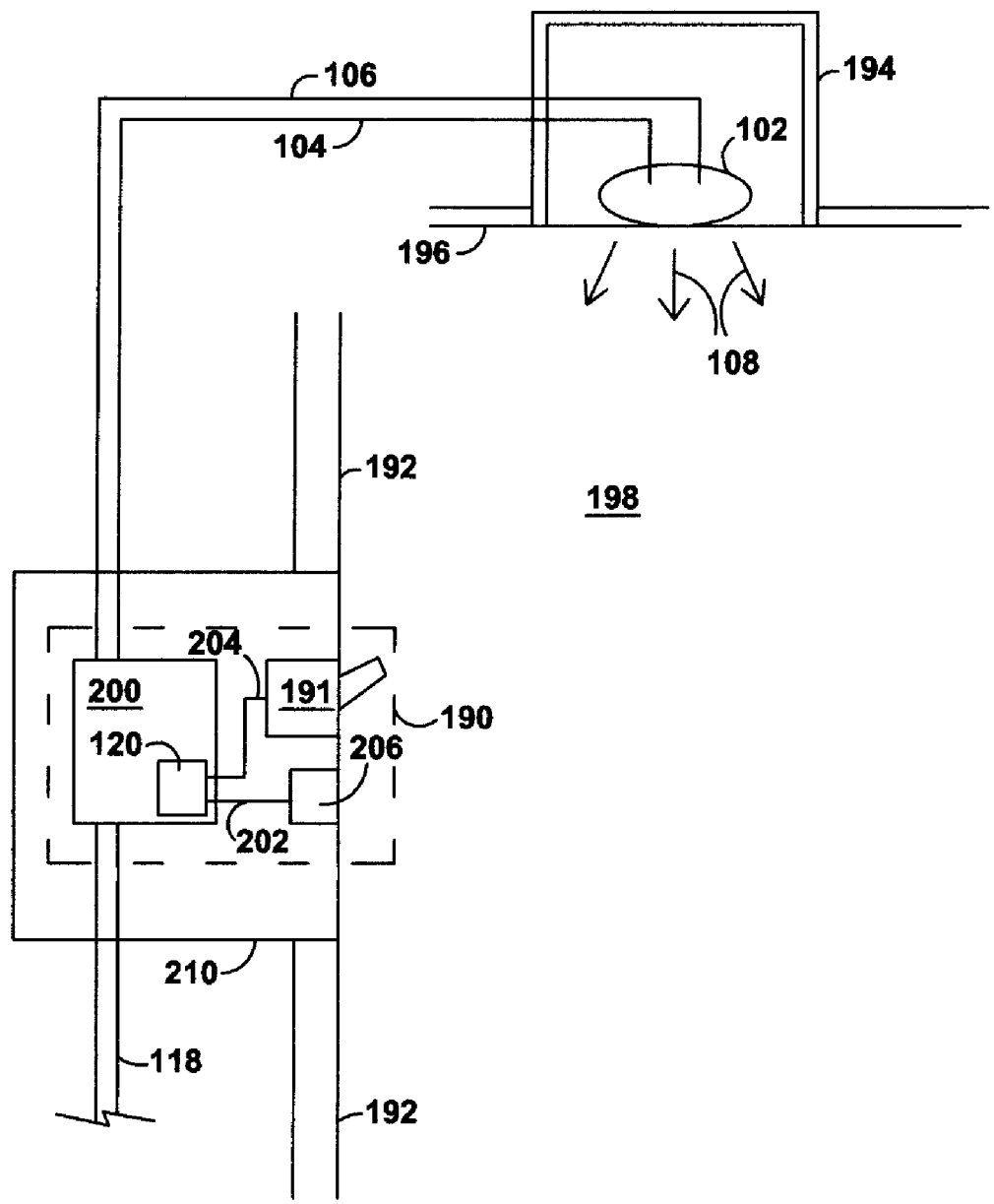
FIG. 6 is a diagrammatic illustration, in elevation, of a control system having a switch for controlling a light emitting diode mounted in a light fixture in a room.

One embodiment in which the control system is located remotely from the LEDs is shown in FIG. 6. In this embodiment, the control system is included in a switch assembly 190 that is installed at a fixed location in a wall 192. Switch assembly 190 includes a switch 191 for controlling the application of power to LED 102 through LED conductors 104 and 106. LED 102 can be installed in a lighting fixture 194 that can be mounted in a fixed position in a ceiling 196 within a room 198 with wall 192 and switch assembly 190. The switch can be a line voltage switch in which case the line voltage is controlled by the switch before it is passed to the control system. In the embodiment shown in FIG. 6, the line voltage is connected to a control system 200 using line conductors 118. Switch 191 is connected using switch conductors 204 to controller 120 within the control system to control power to the LEDs through the control system. Switch assembly 190 can have an on/off function and/or dimming capabilities through control by the controller. A display 206 can be included and connected to the controller with a display conductor 202 to indicate the status of the switch and/or the LED to a user. The display can be one or more colored indicators or can be a screen type display.

Switch assembly 190 can be configured to fit within and connect to a conventional single-gang electrical box 210 such as those typically used for mounting a conventional single-pole line voltage switch in a wall.

Figure 7:
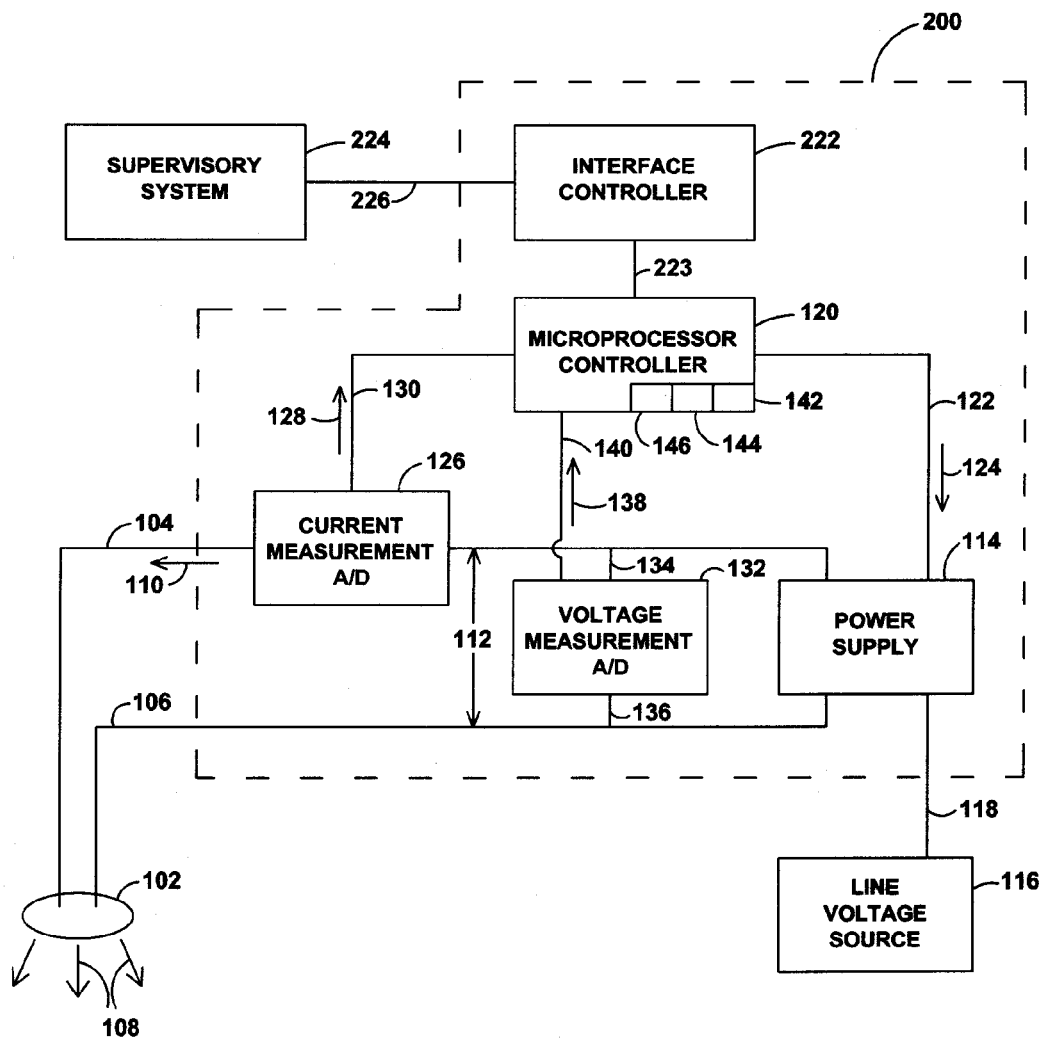
FIG. 7 is a block diagram of a control system having an interface for transferring data to a supervisory system.

Another embodiment of the control system is shown in FIG. 7. Control system 220 includes an interface 222 for transferring data gathered by the control system to a supervisor system 224. Data can be transferred from controller 120 to interface 222 over an interface conductor 223. The supervisor system can be a system that is used for building control and/or monitoring and can receive data gathered by multiple control systems controlling multiple LEDs at different locations. Information regarding power usage, temperature, operable lifetime of the LED and other useful information based on time, temperature, current and/or voltage can be transmitted between control system 220 and supervisor system 224. Control system 220 and/or supervisor system 224 can include displays for notifying users of the status of the LED. The supervisor system can provide control instructions to the control system to cause it to control light output. The interface can connect to the supervisor system using a cable 226 such as an Ethernet cable, over the line conductors 118 or can use wireless communications such as a ZigBee™ or other type of wired or wireless communication to a building information system.

Figure 8:
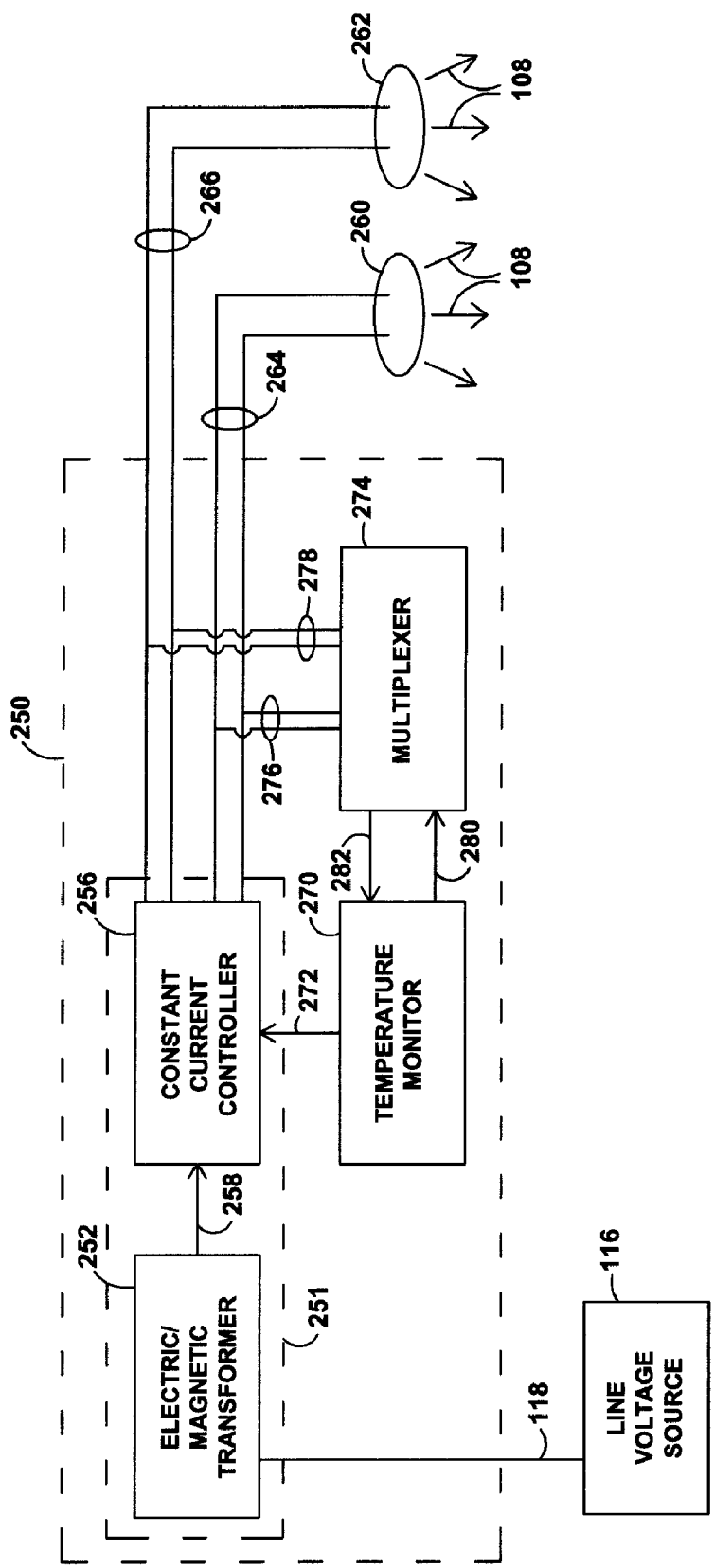
FIG. 8 is a block diagram of a control system for determining a temperature of more than one light emitting diode.

Another embodiment is shown in FIG. 8 in which a control system 250 is arranged for monitor and control of multiple LEDs. Control system 250 includes a power supply 251 with a transformer 252 that is connected to receive line power from line power source 116 through line power conductors 118. Transformer 252 transforms the line voltage, which is 115 Volts AC in the present case, to 12 Volts AC. Line voltage is typically over 100V AC, for the present embodiment. Power supply 251 also includes a current controller 256. The transformer is connected to current controller 256 using a power supply conductor 258 to supply the 12 Volt power to the current controller. Power supply 251 is configured to use the 12 Volts AC to supply an operating current and operating voltage to multiple LEDs. For illustrative purposes in the present embodiment, the current controller is connected to two different LEDs, LED 260 and LED 262. LEDs 260 and 262 can be separate LEDs in one fixture, can be separate LEDs in separate fixtures or each LED 260 and 262 can each represent multiple LEDs that are connected together and/or with other LEDs within a similar thermal environment in a series, parallel or series-parallel circuit arrangement. LED 260 is connected to current controller 256 using LED conductors 264 and LED 262 is connected to current controller 256 using LED conductors 266. Current controller 256 powers LEDs 260 and 262 through the respective LED conductors.

Control system 250 also includes a temperature monitor 270 that is connected to the current controller using a control line 272. Temperature monitor 270 includes a processor as well as current and voltage A/D converters that are not specifically shown in this example. Temperature monitor 270 sends control signals over control line 272 to the current controller to set the operating current to each of the LEDs. Based on the known operating characteristics and limitations of the LEDs, a processor of the temperature monitor can regulate the operating current to the LEDs via controlling the DC current or pulsed DC current. That control may make use of user preferences to maintain constant light output and/or to maintain long life. Temperature monitor 270 can also control the current controller to produce current pulses for measurement purposes over each of the LED conductors.

A multiplexer 274 is connected to LED conductors 264 and 266 using multiplexer conductor lines 276 and 278, respectively. Multiplexer 274 is connected to the temperature monitor using a control line 280 and a signal line 282. Temperature monitor 270 controls the multiplexer through the control line to selectively receive signals from one or the other of LED conductors 264 or 266 through multiplexer conductor lines 276 or 278. The multiplexer then passes the selected signals to the temperature monitor through signal line 282. The temperature monitor then determines the current and voltage on the selected LED conductor and calculates the corresponding temperature of the LED connected to the selected LED conductor. Temperature monitor 270 can then control the current controller to adjust the operating current of the selected LED based on the temperature. This process can then be repeated for the LED that was not previously selected. In this way, each of the LEDs in the system can be monitored for temperature, current, voltage and power usage so long as they have a separate electrical connection to control system 250.

Control system 250 can be included in a switch assembly with a switch, as previously discussed, and the switch assembly can be arranged for installation in a wall of a room to control LEDs supplying light to the room. Control system 250 can also include an interface for communicating with a supervisory system as previously discussed. Using control system 250 with a supervisory system allows the supervisory system to monitor and/or control multiple LEDs on an individual basis.

Figure 9:
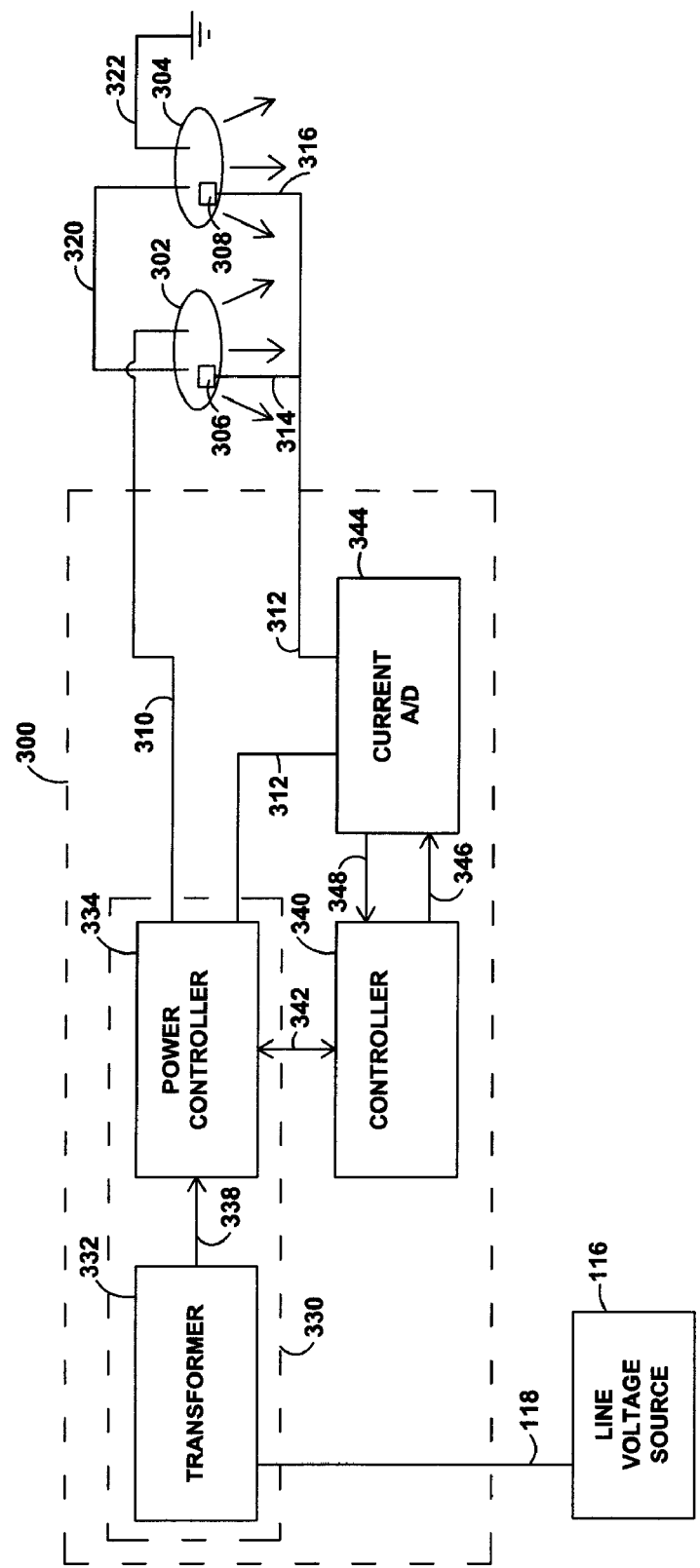
FIG. 9 is another block diagram of a control system for determining a temperature of more than one light emitting diode.

Another multiple LED arrangement is shown in FIG. 9 wherein a control system 300 is connected to two LEDs 302 and 304 that are electrically connected in series. The number of LEDs shown in FIG. 9 is exemplary of a system with multiple LEDs. The LEDs connect to the control system using LED conductors 310 and 312. LEDs 302 and 304 each include an integral heat sink 306 and 308, respectively, that are electrically connected to the LED die. The heat sinks are electrically connected to an LED conductor 312 using conductors 314 and 316. LED 302 is connected to LED conductor 310 using a first power terminal and an LED conductor 320 connects a second power terminal of LED 302 to a first power terminal of LED 304. A second power terminal of LED 304 is connected to an earth ground using a ground conductor 322.

Control system 300 includes a power supply 330 having a transformer 332 and a power controller 334. Transformer 332 receives line power from power source 116 through line power conductors 118 and transforms the line power from a higher voltage to a lower voltage which is transferred to the power controller through a power supply conductor 338. Transformer 332 can be electronic or electro-magnetic. Control system 300 also includes a temperature monitor 340 which can have a microprocessor controller. Temperature monitor 340 is connected to the power controller using a control line 342 to pass control signals between the temperature monitor and the power controller. Power controller 334 supplies power to the LEDs at an operating voltage and at an operating current controlled by the temperature monitor. A current A/D converter 344 is connected to the temperature monitor using a control line 346 and a signal line 348. In this arrangement, each LED effectively has three terminals. Pulses from power controller 334 can be sensed at each LED using current A/D converter 344 through the conductors 314 and 316 as the pulse passes through each LED. Control system 300 can also include a control switch and can be arranged to fit within the volume envelope of a typical single-gang junction box.

Each of the LEDs or groups of LEDs can also include an electronic module with electronics that respond to an analog or digital signal command. The signal commands can originate from a controller in a wall switch, or other location. Each LED module can respond to such commands individually back to the controller via the conductors 314 or 316 by producing a pulse which the controller can detect through current A/D 344. The electronic module can also be arranged to periodically produce a pulse that is unique for each LED or group of LEDs. The electronic module can also be configured to divert all or a portion of the current flowing through conductor 310 to the conductors 314 or 316 and on to the current A/D. The controller can record the current-voltage characteristics and determine a temperature for the LED connected to the module. The controller can then send a signal to have the module adjust current in the LED as required.

Each of the LEDs or groups of LEDs can also have a passive or active filter tuned to a different frequency. In this instance, the filter can be used to address the LED individually. The pulse can include a frequency component which allows the pulse to be received by a selected individual or group of LEDs to allow the temperature of the selected LED to be determined.

The control system described herein can be used as a ballast for LED lighting fixtures and much of the control system can be made in a single IC. The control system allows the determination of the actual temperature of an LED, not an estimated temperature based on a temperature near the LED. The control system can operate using only the two wires normally connected to power the LED. By using centralized control and monitor of the LED temperatures cost for LED fixtures can be reduced over systems in which each fixture includes temperature monitoring and control.

Figure 10:
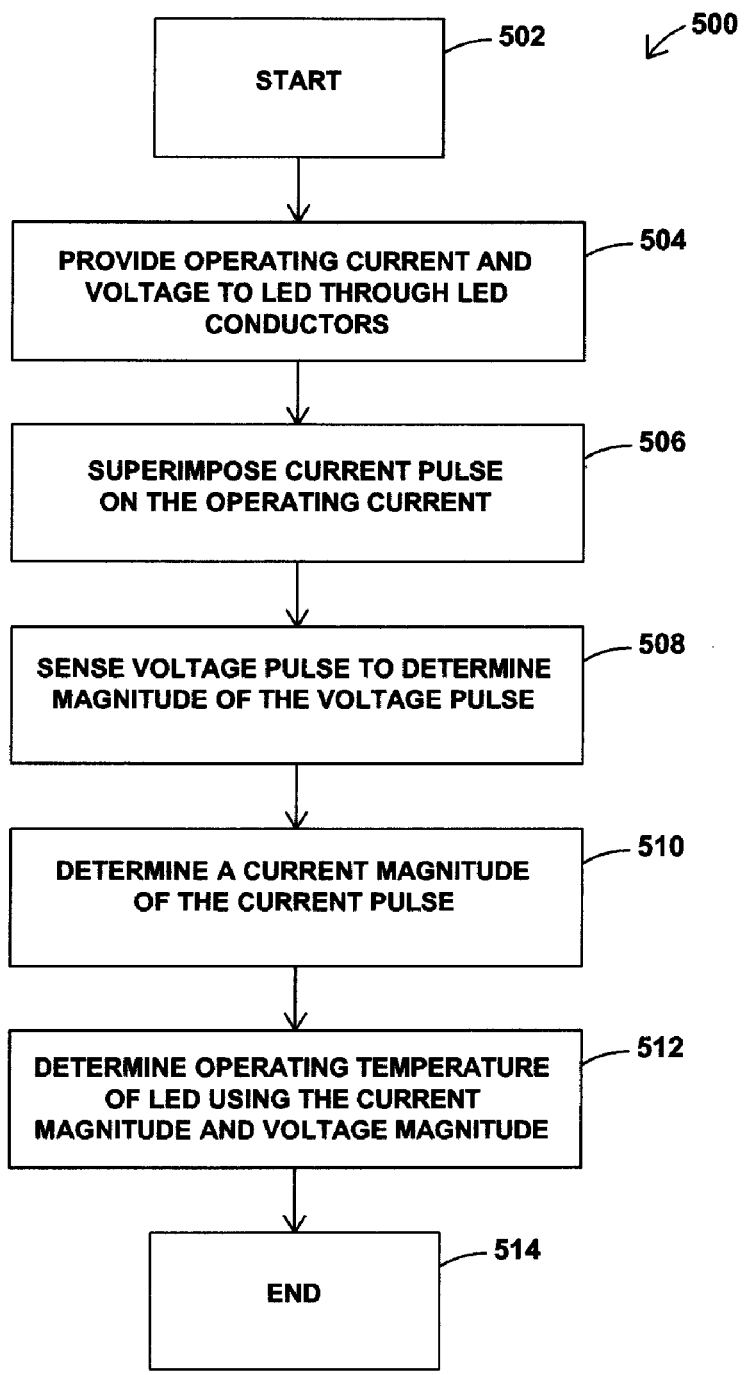
FIG. 10 is a flow diagram illustrating a method for determining a temperature of at least one light emitting diode.

A method 500 is shown in FIG. 10 for determining a temperature of at least one LED. Method 500 begins at a start 502 and then proceeds to a step 504 where an operating current and operating voltage are provided to the LED through first and second LED conductors. Following step 504, method 500 proceeds to step 506 where a current pulse is superimposed on the operating current to the LED through the first and second LED conductors. This results in a voltage pulse that is superimposed on the operating voltage. After step 506, method 500 proceeds to step 508 where the voltage pulse is sensed across the first and second LED conductors to determine a magnitude of the voltage pulse. Method 500 then proceeds to step 510 where a current magnitude of the current pulse is determined. Method 500 then proceeds to step 512 where an operating temperature of the LED is determined based on the current magnitude of the current pulse and the voltage magnitude of the voltage pulse. Method 500 then ends at step 514.

Figure 11:
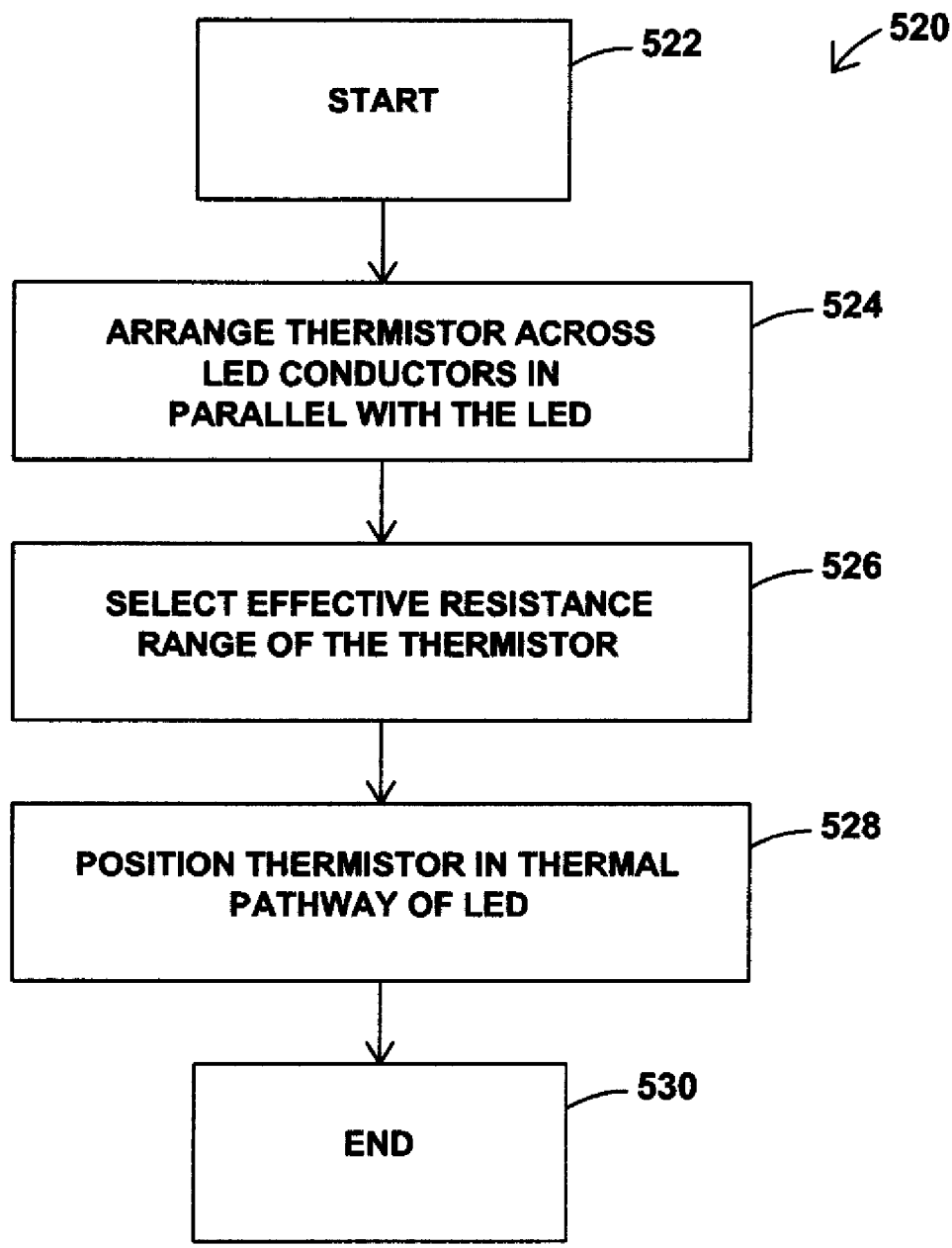
FIG. 11 is a flow diagram illustrating a method for determining a temperature near at least one light emitting diode in a circuit.

A method 520 for determining a temperature near at least one LED in a circuit is shown in FIG. 11. Method 520 begins at a start step 522 and then proceeds to a step 524 where a thermistor is arranged across the first and second LED conductors in parallel with the LED. The thermistor can have an effective resistance range in which at least two different thermistor resistances of the thermistor correspond to at least two different thermistor temperatures of the thermistor. The thermistor resistances in the effective resistance range are lower than the reverse bias voltage resistance of the LED and are higher than the forward voltage resistance of the LED. Following step 524, method 520 proceeds to step 526 where the effective resistance range is selected such that, when a forward drive current is applied to the LED conductors, one portion of the forward drive current which flows through the LED is the forward operating current and another portion of the forward drive current which flows through the thermistor is a forward thermistor current which is smaller than the forward operating current.

When the reverse bias voltage is supplied to the LED conductors, a reverse drive current flows through the LED conductors in an opposite direction than the forward drive current and one portion of the reverse drive current flows as a leakage current through the LED and which does not cause the LED to produce light and another portion of the reverse drive current flows through the thermistor as a reverse thermistor current which is larger than the leakage current. Following step 526, method 520 proceeds to step 528 where the thermistor is positioned in a thermal pathway of the LED to receive heat produced by the LED during operation of the LED. The temperature of the thermistor is measurable by determining the thermistor resistance using the reverse thermistor current and the temperature of the thermistor is related to a temperature of the LED. After step 528, method 520 proceeds to step 530 where the method ends.

Figure 12:
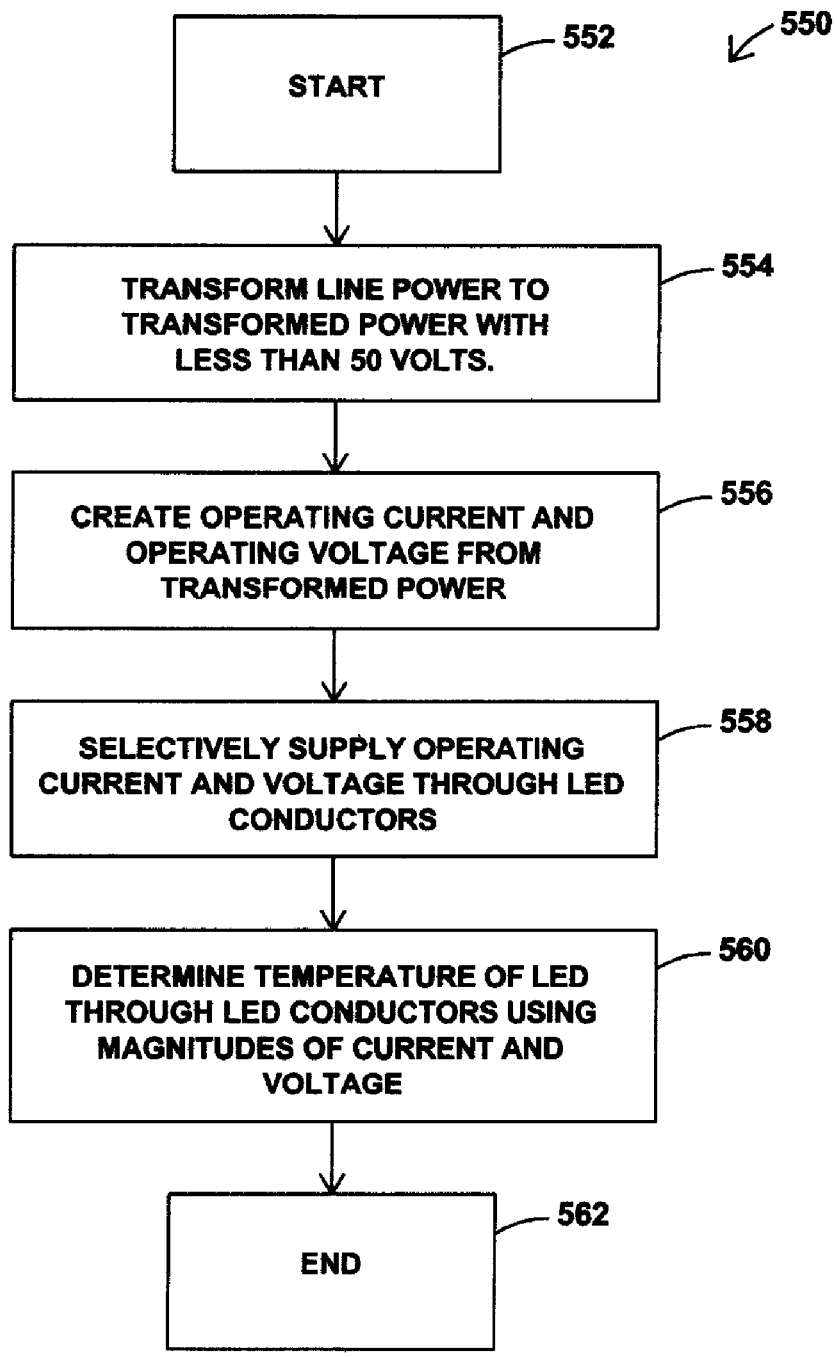
FIG. 12 is a flow diagram illustrating a method for electrically communicating with at least one LED assembly to control the LED assembly.

A method 550 for electrically communicating with at least one LED assembly to control the LED assembly is shown in FIG. 12. Method 550 begins at a start step 552 and then proceeds to a step 554 where a line power source is transformed. The line power source having a line voltage greater than 100 Volts AC and the line voltage is converted to a transformed power with a transformed voltage that is less than 50 Volts. Following step 554, method 550 proceeds to step 556 where the transformed power is received and an operating power with at least the operating current in the range of operating currents and the operating voltage in the range of operating voltages is created. After step 556, is a step 558 where the operating current and operating voltage are selectively supplied to the LED assembly through the LED conductors to control light output of the LED assembly. Following step 558 is a step 560 where a temperature of the LED is determined through the LED conductors at least partially by determining a magnitude of current through the LED conductors and determining a magnitude of voltage across the LED conductors. After step 560, method 550 ends at step 562.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for determining a temperature of at least one light emitting diode (LED) in a circuit which includes a power supply for powering the LED, where the LED is operable to generate light, the method comprising:
   providing an operating current and an operating voltage to the LED;
   superimposing a first current pulse on the operating current;
   sensing a magnitude of a first voltage pulse across the LED resulting from the applied first current pulse superimposed on the operating current;
   superimposing at least a second current pulse, different from the first current pulse, on the operating current;
   sensing a magnitude of a second voltage pulse across the LED resulting from the applied second current pulse superimposed on the operating current;
   deriving an operating temperature curve utilizing (i) logarithms of magnitudes of the first and second current pulses and (ii) magnitudes of the first and second voltage pulses;
   determining a slope of the operating temperature curve; and
   determining an operating temperature of the LED based on the determined slope of the operating temperature curve.

2. The method according to claim 1, further comprising:
   before providing the operating current, providing an initial operating current and initial operating voltage at a known initial temperature of the LED;
   determining at least one LED parameter based on the initial operating current, initial operating voltage, and initial temperature, the operating temperature being determined based in part on the LED parameter.

3. The method according to claim 2 wherein the initial operating current and initial operating voltage are provided at a time when the LED has reached a resting temperature that is essentially the same as an ambient temperature around the LED.

4. The method according to claim 3 wherein determining the operating temperature includes using the LED parameter in the ideal diode equation $$I = I_o \exp\left[\frac{V - E_g}{AkT}\right],$$

where I is the operating current, $I_o$ is a constant, V is the voltage applied across a diode junction of the LED, $E_z$ is the effective optical band gap of the semiconductor at the diode junction, A is the diode factor, k is Boltzmann's constant, and T is the operating temperature in degrees Kelvin.

5. The method according to claim 4 wherein the LED parameter is related to the effective optical band gap of the LED.

6. The method according to claim 4 wherein the LED parameter is used to determine a current to voltage curve for at least one temperature.

7. The method according to claim 1 wherein the operating temperature is determined by comparing the slope of the operating temperature curve to predetermined slope values that correspond to different LED temperatures.

8. The method according to claim 1 wherein superimposing includes selecting a power supply that exhibits a ripple current and using the ripple current as at least one of the first current pulse or second current pulse.

9. The method according to claim 1 wherein the circuit including the LED and the power supply is part of a device to at least provide illumination to assist visual perception of humans, and where the superimposition of the first current pulse on the operating current produces a temporary change in the light level from the LED that is less than an interval having a duration imperceptible to humans.

10. The method according to claim 1, wherein the LED is operable at a temperature less than a maximum temperature and is subject to thermal damage at a damage temperature exceeding the maximum temperature, the method further comprising:
    comparing the operating temperature with the maximum temperature; and
    reducing the operating current responsive to the operating temperature exceeding the maximum temperature.

11. The method according to claim 1 wherein the superimposed first current pulse lowers the magnitude of the operating current to a value that is less than another value of the operating current that would otherwise be present without the superimposed first current pulse.

12. The method according to claim 1 further comprising:
    electrically connecting a thermistor in parallel with the LED, the thermistor having an effective resistance range that is lower than a reverse bias resistance of the LED and that is higher than a forward voltage resistance of the LED, wherein the superimposition of the first current pulse causes a relatively larger amount of the first current pulse to flow through the thermistor and a relatively smaller amount of the first current pulse to flow through the LED; and
    determining a temperature of the thermistor based on a portion of the first current pulse flowing therethrough.

13. The method according to claim 12 including using the thermistor temperature in a calibration procedure to increase an accuracy of the determination of the operating temperature of the LED.

14. The method according to claim 1 further comprising:
    receiving with a ballast a utility power in the form of a utility alternating current and a utility alternating voltage, the alternating voltage having a root-mean-square voltage over 100 Volts, and wherein providing the operating current to the LED includes converting the utility alternating current into the operating current using the ballast, the ballast having a size smaller than a volume envelope of a conventional single gang junction box.

15. The method according to claim 1 further comprising:
    determining multiple operating temperatures at multiple different times and saving values of the temperatures and times at which the temperatures were determined to determine an overall operable lifetime of the LED.

16. The method according to claim 15 further comprising:
    determining the overall operable lifetime of the LED based at least in part on the multiple operating temperatures and the multiple times at temperature.

17. The method according to claim 16 further comprising:
    indicating the overall operable lifetime of the LED to a user.

18. The method according to claim 16 further comprising:
    providing the determined overall operable lifetime of the LED to a system that monitors power usage.

19. The method according to claim 16, wherein the operation lifetime increases when the LED is operated with the operating temperature below a maximum operating temperature, the method further comprising:
    comparing the operating temperature with the maximum temperature; and
    reducing the operating current to reduce the operating temperature below the maximum operating temperature.

20. The method according to claim 1 wherein there are at least two LEDs in the circuit and wherein the superimposed first current pulse includes a frequency component at a predetermined frequency, the method further comprising:
    passing the first current pulse to a first LED while blocking the first current pulse to the second LED based on the frequency component and wherein the determined operating temperature is the operating temperature of the first LED.

21. The method according to claim 1 wherein the determined operating temperature is a first operating temperature which occurs at a first time and further comprising determining a second, different operating temperature at a second, different time.

22. The method according to claim 1 wherein the provided operating voltage is between 1.5 Volts and 2.5 Volts DC.

23. The method according to claim 1 wherein the superimposed first and second current pulses are portions of a current ramp having a plurality of current magnitudes and the sensed first and second voltage pulses are portions of a voltage ramp having a plurality of voltage magnitudes corresponding to the current magnitudes.

24. The method according to claim 1 wherein superimposing the first current pulse, sensing the first voltage pulse, and determining the operating temperature are performed periodically.

25. A control system for determining a temperature of at least one light emitting diode (LED) receiving an operating current and an operating voltage, the LED being operable at an operating temperature, the control system comprising:
    a power supply for providing the operating current and operating voltage to the LED, the power supply superimposing at least first and second current pulses on the operating current to the LED resulting in, respectively, first and second voltage pulses superimposed on the operating voltage;
    a voltage sensor for determining magnitudes of the voltage pulses;
    a current sensor for determining magnitudes of the current pulses; and a controller for (a) deriving an operating temperature curve utilizing (i) logarithms of the magnitudes of the current pulses and (ii) the magnitudes of the voltage pulses, (b) determining a slope of the operating temperature curve, and (c) determining the operating temperature of the LED based on the determined slope of the operating temperature curve.

26. The control system according to claim 25, wherein the controller controls the power supply to provide an initial operating current and initial operating voltage at a known initial temperature of the LED before providing the operating current, and the controller uses the measured values of the initial operating current, initial operating voltage and initial temperature to determine at least one LED parameter of the LED, and the controller determines the operating temperature using the determined LED parameter.

27. The control system according to claim 25 wherein the controller controls the power supply to provide the initial operating current and initial operating voltage at a time when the LED has reached a resting temperature that is essentially the same as an ambient temperature around the LED.

28. The control system according to claim 25 wherein the controller determines the operating temperature using the LED parameter in the ideal diode equation $$I = I_o \exp\left[\frac{V - E_g}{AkT}\right],$$

where I is the operating current, $I_o$ is a constant, V is the voltage applied across a diode junction of the LED, $E_g$ is the effective optical band gap of the semiconductor at the diode junction, A is the diode factor, k is Boltzmann's constant, and T is the operating temperature in degrees Kelvin.

29. The control system according to claim 28 wherein the LED parameter is related to the effective optical band gap of the LED.

30. The control system according to claim 28 wherein the LED parameter is used to determine a current to voltage curve for at least one temperature.

31. The control system according to claim 25 wherein the controller determines the operating temperature by comparing the slope of the operating temperature curve to predetermined slope values that correspond to different LED temperatures.

32. The control system according to claim 25 wherein the power supply superimposes at least one of the first or second current pulses on the operating current at a predetermined magnitude such that the determined magnitude of at least one of the first or second current pulses is the predetermined magnitude.

33. The control system according to claim 25 wherein the power supply exhibits a ripple current that is used as at least one of the current pulses.

34. The control system according to claim 25 wherein the circuit including the LED and the power supply is part of a device to at least provide illumination to assist visual perception of humans, and where the power supply superimposes the current pulses on the operating current to produce temporary changes in the light level from the LED that are less than an interval having a duration imperceptible to humans.

35. The control system according to claim 25, wherein the LED is operable at a temperature less than a maximum temperature and is subject to thermal damage at a damage temperature exceeding the maximum temperature, and wherein the controller compares the operating temperature with the maximum temperature and reduces the operating current responsive to the operating temperature exceeding the maximum temperature.

36. The control system according to claim 25 wherein the power supply superimposes at least one of the current pulses resulting in lowering the magnitude of the operating current to a value that is less than another value of the operating current that would otherwise be present without a superimposed current pulse.

37. The control system according to claim 25 further comprising:
a thermistor electrically connected in parallel with the LED, and the thermistor having an effective resistance range that is lower than a reverse bias resistance of the LED and that is higher than a forward voltage resistance of the LED, and wherein the power supply superimposes the first current pulse resulting in a relatively larger amount of the first current pulse flowing through the thermistor and a relatively smaller amount of the first current pulse flowing through the LED, the controller determining a temperature of the thermistor based on a portion of the first current pulse flowing therethrough.

38. The control system according to claim 37, wherein the controller uses the thermistor temperature in a calibration procedure to increase an accuracy of the determination of the operating temperature of the LED.

39. The control system according to claim 25 further comprising:
a ballast for receiving a utility power in the form of a utility alternating current and a utility alternating voltage, the alternating voltage having a root-mean-square voltage over 100 Volts, wherein the ballast converts the utility alternating current into the operating current and provides the operating current to the LED and control system, wherein the ballast has a size smaller than a volume envelope of a conventional single gang junction box.

40. The control system according to claim 25 wherein the controller determines multiple operating temperatures at multiple different times, and further comprising:
a clock for determining times; and
a memory for saving values of the temperatures and times at which the temperatures were determined to facilitate determining an overall operable lifetime of the LED.

41. The control system according to claim 40 further comprising:
means for configuring the controller to determine the overall operable lifetime of the LED based at least in part on the multiple operating temperatures and the multiple times at temperature.

42. The control system according to claim 41 further comprising:
a display for indicating the overall operable lifetime of the LED to a user.

43. The control system according to claim 40 further comprising:
an interface for providing the determined overall operable lifetime of the LED to a separate, different system that monitors power usage.

44. The control system according to claim 40, wherein the overall operable lifetime increases when the LED is operated with the operating temperature below a maximum operating temperature, the controller being further configured to compare the operating temperature with the maximum temperature and to reduce the operating current to reduce the operating temperature below the maximum operating temperature.

45. The control system according to claim 25 wherein there are at least two LEDs in the circuit, and wherein the power supply superimposes the first current pulse with a frequency component at a predetermined frequency, and further comprising:

a first frequency filter positioned for passing the first current pulse to a first LED and a second frequency filter positioned for blocking the first current pulse to the second LED based on the frequency component, the controller determining the operating temperature of the first LED.

46. The control system according to claim 25 wherein the operating temperature determined by the controller is a first operating temperature which occurs at a first time and further comprising configuring the controller to determine a second, different operating temperature at a second, different time.

47. The control system according to claim 25 wherein the power supply is arranged to provide the operating voltage at 1.5 Volts to 2.5 Volts DC.

48. The control system according to claim 25 wherein the power supply superimposes the first and second current pulses as portions of a current ramp having a plurality of current magnitudes and the sensed first and second voltage pulses are portions of a voltage ramp having a plurality of voltage magnitudes corresponding to the current magnitudes, the controller determining the operating temperature based on a curve relating a log of a plurality of the currents against the corresponding plurality of voltages.

49. The control system according to claim 25 wherein the control system superimposes the current pulses, senses the voltage pulses, determines the magnitude of the current pulses, and determines the operating temperature periodically.

50. The control system according to claim 25 wherein at least a portion of the control system is integrated into a chip.

* * * * *